US011329305B2

(12) United States Patent
Buvat et al.

(10) Patent No.: US 11,329,305 B2
(45) Date of Patent: May 10, 2022

(54) INSTALLATION FOR ASSEMBLING FUEL CELL MEMBRANES

(71) Applicants: COMMISSARIAT À L'ENERGIE ATOMIQUE ET AUX ENERGIES ALTERNATIVES, Paris (FR); BERTIN TECHNOLOGIES, Montigny-le-Bretonneux (FR)

(72) Inventors: Pierrick Buvat, Montbazon (FR); Stéphane Carriere, Villandry (FR); Laurent Chazot, Joue-les-Tours (FR); Jérôme Serre, Pertuis (FR); Jean-Jacques Bougy, Garancieres (FR)

(73) Assignees: COMMISSARIAT À L'ENERGIE ATOMIQUE ET AUX ENERGIES ALTERNATIVES, Paris (FR); BERTIN TECHNOLOGIES, Montigny-le-Bretonneux (FR)

( * ) Notice: Subject to any disclaimer, the term of this patent is extended or adjusted under 35 U.S.C. 154(b) by 51 days.

(21) Appl. No.: 16/610,577

(22) PCT Filed: May 3, 2018

(86) PCT No.: PCT/FR2018/051107
§ 371 (c)(1),
(2) Date: Nov. 4, 2019

(87) PCT Pub. No.: WO2018/203006
PCT Pub. Date: Nov. 8, 2018

(65) Prior Publication Data
US 2020/0091540 A1 Mar. 19, 2020

(30) Foreign Application Priority Data

May 3, 2017 (FR) .................................. 1753896
May 3, 2017 (FR) .................................. 1753911
May 3, 2017 (FR) .................................. 1753914

(51) Int. Cl.
*H01M 8/2404* (2016.01)
*H01M 8/0267* (2016.01)
(Continued)

(52) U.S. Cl.
CPC ....... *H01M 8/2404* (2016.02); *H01M 8/0267* (2013.01); *H01M 8/0273* (2013.01);
(Continued)

(58) Field of Classification Search
CPC . H01M 8/0273; H01M 8/1093; H01M 8/2404
(Continued)

(56) References Cited

U.S. PATENT DOCUMENTS

2002/0192058 A1* 12/2002 Harsch ................... B21D 43/05
414/225.01
2007/0271770 A1 11/2007 Fujiki et al.
(Continued)

FOREIGN PATENT DOCUMENTS

| CN | 104 835 978 | 8/2015 |
| FR | 3 037 444 | 12/2016 |
| JP | 2007 287436 | 11/2007 |

OTHER PUBLICATIONS

International Patent Application No. PCT/FR2018/051107, International Search Report and Written Opinion dated Jul. 26, 2018, 13 pgs. (relevance in citations and English translation of ISR).

*Primary Examiner* — James M Erwin
(74) *Attorney, Agent, or Firm* — Lathrop GPM LLP

(57) ABSTRACT

The invention relates to an installation (1) for assembling fuel cell membranes comprising:
a first station (A1) for storing electrode membranes, a second station (A2) for storing reinforcing membranes, a station for stacking the membranes of the first (A1)
(Continued)

and second (A2) storage stations, and a station (P) for pressing and heating a membrane assembly, means for conveying and handling (B1, B2) the membranes of the first (A1) and second (A2) storage stations, stacking of the stacking station and membrane assembly of the pressing and heating station.

20 Claims, 22 Drawing Sheets

(51) Int. Cl.
      *H01M 8/0273*     (2016.01)
      *H01M 8/1004*     (2016.01)
      *H01M 8/1086*     (2016.01)
      *H01M 8/10*     (2016.01)

(52) U.S. Cl.
      CPC ....... *H01M 8/1004* (2013.01); *H01M 8/1093* (2013.01); *H01M 2008/1095* (2013.01)

(58) Field of Classification Search
      USPC .......................................................... 429/452
      See application file for complete search history.

(56) References Cited

U.S. PATENT DOCUMENTS

| | | | |
|---|---|---|---|
| 2010/0112403 A1* | 5/2010 | Berggren | H01M 8/0258 429/452 |
| 2016/0365598 A1 | 12/2016 | Ju et al. | |
| 2016/0365599 A1 | 12/2016 | Ju et al. | |
| 2018/0006321 A1* | 1/2018 | Cho | H01M 8/2404 |
| 2018/0159150 A1* | 6/2018 | Kim | H01M 8/248 |

* cited by examiner

INSTALLATION FOR ASSEMBLING FUEL CELL MEMBRANES

CROSS-REFERENCE TO RELATED APPLICATIONS

This application is a 35 U.S.C. § 371 filing of International Application No. PCT/FR2018/051107 filed May 3, 2018, which claims the benefit of priority to French Patent Application No. 1753896 filed May 3, 2017; French Patent Application No. 1753914 filed May 3, 2017; and French Patent Application No. 1753911 filed May 3, 2017, each of which is incorporated herein by reference in its entirety.

FIELD OF THE INVENTION

This invention relates to the field of fuel cell membrane/electrode assembling devices.

TECHNICAL BACKGROUND

Proton exchange membrane fuel cells, known as PEMFCs, stand for "proton exchange membrane fuel cells" or "polymer electrolyte membrane fuel cells" and have particularly interesting compactness properties. Each cell includes a polymer electrolyte membrane that enables only the passage of protons and not the passage of electrons. The membrane is contacted with an anode on a first side and with a cathode on a second side to form a membrane/electrode assembly called MEA.

The above assembly is generally carried out by successive superposition of the different membranes and electrodes with an interposition of reinforcing membranes to support the assembly. However, to ensure proper mutual positioning of the various elements, it is imperative to ensure optimal positioning of the polymer electrolyte membrane with the reinforcing membrane. An obvious solution would be to use a robotic device that would be able to successively assemble the different elements together. However, none of the current automated devices or installations are satisfactory in terms of compactness and speed of assembly.

SUMMARY OF THE INVENTION

This document thus relates to an installation for assembling fuel cell membranes comprising:
- a first electrode membrane storage station, a second reinforcing membrane storage station, a membrane stacking station at the first and second storage stations, and a pressing and heating station for a membrane assembly,
- means for conveying and handling the membranes of the first and second storage stations, a stack of the stacking station and a membrane assembly of the pressing and heating station.
- means for controlling the conveying and handling means, so configured that the departure of a stack from the stacking station to the pressing and heating station is followed by a new step of stacking on the stacking station.

In the installation, the electrode membranes are arranged in a first storage station and the second reinforcing membranes are arranged in a second storage station independent of the first station. A stacking station also independent of the first and second storage stations makes it possible to stack membranes from the first and second stations. Advantageously, when a stack is obtained on the stacking station, the resulting assembly is moved to the pressing and heating station.

The use of several separate stations ensures that the membranes are stored and positioned in a predetermined known position and that the membranes are properly centred and positioned in their station. It is thus possible to accurately stack the electrode and reinforcing membranes on the stacking station, which would be difficult to achieve with a single station comprising the different membranes because of their different respective dimensions (different bulks). It should also be noted that the stations are not limited to the storage of the indicated membranes only, so it must be understood that the storage stations must allow the storage of the mentioned membrane while allowing the storage of another membrane if necessary. Thus, the second station can allow the storage of a reinforcing membrane to which another membrane is attached so that the second station is indeed a storage station for reinforcing membranes but not only for reinforcing membranes.

In addition, it must be understood that the purpose of the stations is to allow storage of said membranes concerned without these stations, as previously defined for the installation, necessarily including said membranes.

According to another characteristic, the conveying and handling means comprise at least first and second manipulators including membrane gripping and placing means, the first arm being configured to move an electrode membrane from the first storage station to the stacking station and the second arm being configured to move one or more membrane(s) from the second storage station to the pressing and heating station.

Thus, each storage station, comprising a given type of membrane, is associated with a dedicated manipulator for moving the membranes to the stacking station, which makes it possible to optimize the settings of the gripping and placing means for each type of membrane, particularly because of the different thicknesses of the electrode membranes and the reinforcing membranes and the different stiffness/flexibility of the membranes.

This is more particularly suitable when the gripping and placing means of the first and second manipulators include suction gripping means, the vacuum applied to the surface of a membrane being predetermined for each of the manipulators according to the membrane to be gripped.

According to another characteristic of the installation, the first manipulator includes a plurality of bellows suction cups connected to means for supplying a vacuum. As for the second manipulator, it can include a rigid frame comprising a flat gripping face comprising a plurality of perforations connected to means for providing a vacuum.

In a particular embodiment of the installation, the first manipulator is articulated to be able to make a first displacement of an electrode membrane from the first storage station to a tray of the receiving station with a turning over of the electrode membrane and to be able to make a second displacement of another electrode membrane from the first storage station to the tray of the receiving station without turning over the electrode membrane.

Each electrode membrane may include a first layer and a second layer separate from each other. The first layer is a diffusion layer formed of a carbon fabric whereon the second catalytic layer comprising a binder incorporating a catalyst such as platinum is deposited. This configuration of the articulation of the first manipulator of the electrode membranes allows the creation of a stack of an electrode then a reinforcing membrane and the creation of a stack of a reinforcing membrane then an electrode membrane, with the second layer arranged opposite the reinforcing membrane, and this by using a first station comprising a, preferably vertical, stack of electrode membranes one above the other in an identical manner, with the first layers arranged upwards so that they can be gripped by the gripping and placing means of the first manipulator, avoiding gripping on the second layer of the electrodes that carries the catalyst.

Preferably, the stacking station includes a tray with a notch sized to receive a portion of the first manipulator arm carrying an electrode while the electrode is flush with an upper surface of the tray.

According to another characteristic of the installation, the conveying and handling means include a third manipulator comprising means for gripping and placing a support membrane stored in a third storage station, this third manipulator being configured to bring the support membrane from the third storage station to the pressing and heating station. The support membrane can be locked in a metal frame that can be manipulated by the gripping and placing means of the third manipulator.

The gripping and placing means of the third manipulator may include magnetic gripping means such as electromagnets whose magnetization is controlled by the control means.

Also, the pressing and heating station can be interposed in a given direction between a longitudinal rail of movement of the third manipulator and the stacking station, said longitudinal direction of the rail being perpendicular to said given direction.

The stacking station can be arranged in the longitudinal direction between the first storage station and the second storage station.

The installation may include a fourth separator sheet storage station and a fourth separator sheet manipulator configured to move a separator sheet from the first storage station to said fourth storage station. These separator sheets can be inserted between two electrode membranes from the first storage station. A separator sheet first provides a protective function of the second active layer by limiting friction of the second layer of an electrode with a first layer of an adjacent electrode, when the electrodes are all positioned in the same way, with the first layer or diffusion layer facing upwards and able to be grasped by the gripping means. In addition, the use of a separator sheet with a smooth surface, at least smoother than the second layer of the electrode, prevents the suction gripping from inducing a gripping of two electrodes simultaneously, which could be the case in the absence of a separator sheet.

According to another characteristic, the installation includes a cutting station, preferably using laser means, of a contour through the membrane assembly after pressing and heating using the pressing and heating station.

Preferably, the first storage station and the second storage station each include a storage magazine and means for positioning the membranes of the associated station in a predetermined position. Thus, the spatial positioning of each of the membranes of the first and second station is carried out at a reference frame of each of the storage stations and thus avoids having to make an active determination, by optical means for example, in the space of the membrane positions at the stacking station.

Preferably, each magazine is guided in a given direction, preferably vertically, on a stationary frame and includes means for damping and returning the magazine to a predetermined position in the absence of force exerted on the magazine, in that direction, by a manipulator for gripping a membrane of the magazine concerned, which makes it easier for a manipulator to grip each membrane by preventing the manipulator from coming into contact with the upper membrane of the stack of membranes of the magazine inducing excessive stress on the manipulator and on the membrane being gripped.

The stacking station advantageously comprises means for securing a stack at the stacking station. This allows the stacked membranes to be secured in a predetermined position on the stacking station before being moved to the pressing and heating station.

In a first possible use of the installation, it is such that:
the first storage station comprises a stacking in a vertical direction of electrode membranes with a diffusion layer being arranged upwards,
the second storage station comprises an alternation of first reinforcing membranes comprising an opening and second reinforcing membranes comprising an opening, each second reinforcing membrane being secured to a polymer electrolyte membrane which closes its opening and which is arranged opposite a first reinforcing membrane, the polymer electrolyte membrane being sized so that its outer edge is inscribed between the inner, and the outer edges of the first and second reinforcing membranes,
the third storage station comprises a stack of support membranes having an outer edge and an inner edge delimiting an opening of the support membrane, this opening being dimensioned in such a way that the polymer electrolyte membrane can fit into said opening and that the first reinforcing membrane and the second reinforcing membrane can cover the entire inner edge of the support membrane.

In a second possible use of the installation, it is such that:
the first storage station comprises a stacking in a vertical direction of electrode membranes with a diffusion layer being arranged upwards,
the second storage station comprises a plurality of reinforcing membranes each comprising one opening,
the third storage station includes a stack of support membranes, each formed by a polymer electrolyte membrane.

The supporting membrane can be supported by a frame, for example made of metal. This frame ensures that the support membrane is tensioned to ensure its flatness without deformation.

This document relates to a heating and cooling tray intended for use in a pressing and heating station as described above. The tray can include at least one heating cord and one coolant system inside.

The use of such a tray allows a fast heating of the tray and a fast cooling due to the integration of a liquid circuit.

According to another characteristic, the heating cord and the coolant circuit are each arranged substantially in a plane, these planes being different, i. e. distinct, from each other and parallel to each other and to first and second sides of the plate, so as to have successively a first face of the plate, the heating cord, the cooling circuit and then the second face of the plate.

Preferably, the plane of the heating cord should be arranged as close as possible to a surface of the tray so that it can be brought into contact with an element to be heated.

According to another characteristic, the first side includes at least one groove housing said heating cord and in which the cooling system includes at least one cooling liquid circulation channel.

In order to allow a good distribution of cold and heat, each of the cooling channel(s) and groove(s) is of the coil type.

The tray can comprise at least one first plate made of a thermally conductive material, this first plate comprising on a first face forming the first face of the tray said at least one groove and on an opposite second face at least one groove sealed by a second plate so as to form a cooling liquid circulation channel.

The first plate can be made of two layers assembled together with a thermally conductive cement to promote heat flows from one to the other of the two layers, a first layer integrating the heating cord and a second layer integrating the cooling circuit.

Preferably, at least one of said at least one groove and said at least one channel leads to a flank of said first plate or tray.

According to another characteristic, the first plate is made of a material, for example metal, having a thermal conduction coefficient of at least 100 W/m/K and a Young's modulus of at least 100 GPa. Such a combination makes it possible to have an excellent compromise for a material with good thermal conduction properties (heating and cooling performance), good mechanical properties allowing it to withstand compression forces while allowing simple manufacturing by machining the cooling circuit.

A good example of a material is copper, which has a thermal conductivity coefficient of 390 W/m/K and a Young's modulus of 124 GPa. Brass would also be suitable since it has a thermal conductivity coefficient of 120 W/m/K and a Young's modulus of 100 to 130 GPa.

Preferably, the heating cord is of the resistive type and includes two free ends connected to power supply means.

The heating cords can be matted externally with nickel wire.

Another characteristic is that the cooling system consists of at least two fluidly independent parts arranged side by side and extending in the same plane.

Also, each circuit part can be of the coil type with an input and an output, the distance along the circuit from the input of the circuit to the center of the plate being less than the distance from the output of the circuit to the center of the plate.

This document also covers an assembly comprising a tray and a compression plate made of a thermally conductive material, this compression plate being applied to the first face of the tray and being dimensioned so that the masses of material on either side of a median plane of the heating cord are substantially identical, in order to limit the bending effects of the first plate.

In addition, a press for manufacturing a fuel cells membrane/electrodes assembly comprising a piston having at one free end a plate of the type described above or an assembly as mentioned above is still involved.

Alternatively, the press may include a static support facing the piston, the support carrying a tray of the type described above or an assembly as mentioned above.

In addition, it is also described a hydraulic press for making a fuel cells membrane/electrodes assembly comprising a piston comprising at one end a heating and cooling plate on which is applied a removable compression plate intended to come into contact with a membrane/electrodes assembly.

Such a press allows the heating and cooling zone to be adapted to the dimensions of the membrane/electrode assembly to be made, by changing only the compression plate, which is simple and quick to do. The compression plate is made of a good thermal conductor material. It can have the same heat transfer and mechanical resistance properties as the heating and cooling tray. It can be made of the same material as the heating and cooling plate.

The invention will be better understood and other details, characteristics and advantages of the invention will appear when reading the following description, which is given as a non-limiting example, with reference to the attached drawings.

DETAILED DESCRIPTION

Figure 1:
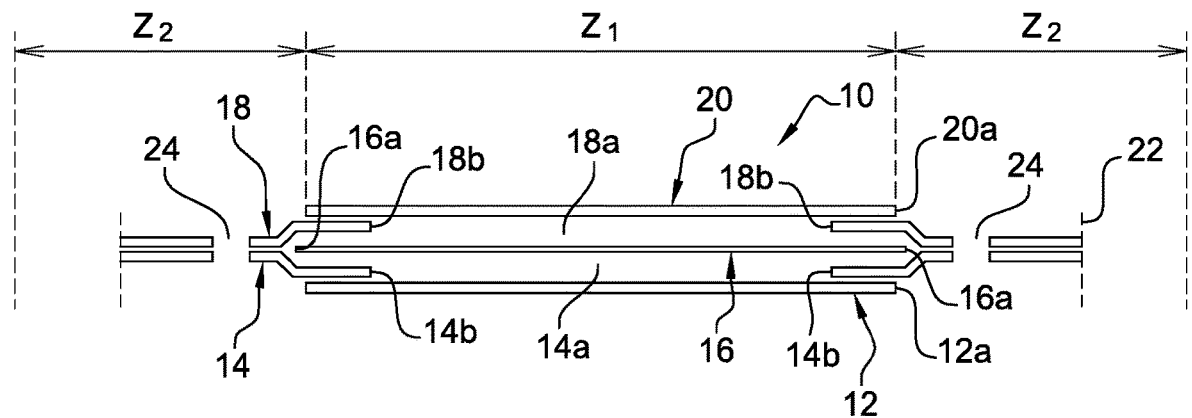
FIG. 1 is a schematic illustration of a first electrode-polymer electrolyte membrane/electrode assembly intended to be carried out with an installation according to the invention.
Figure 3:
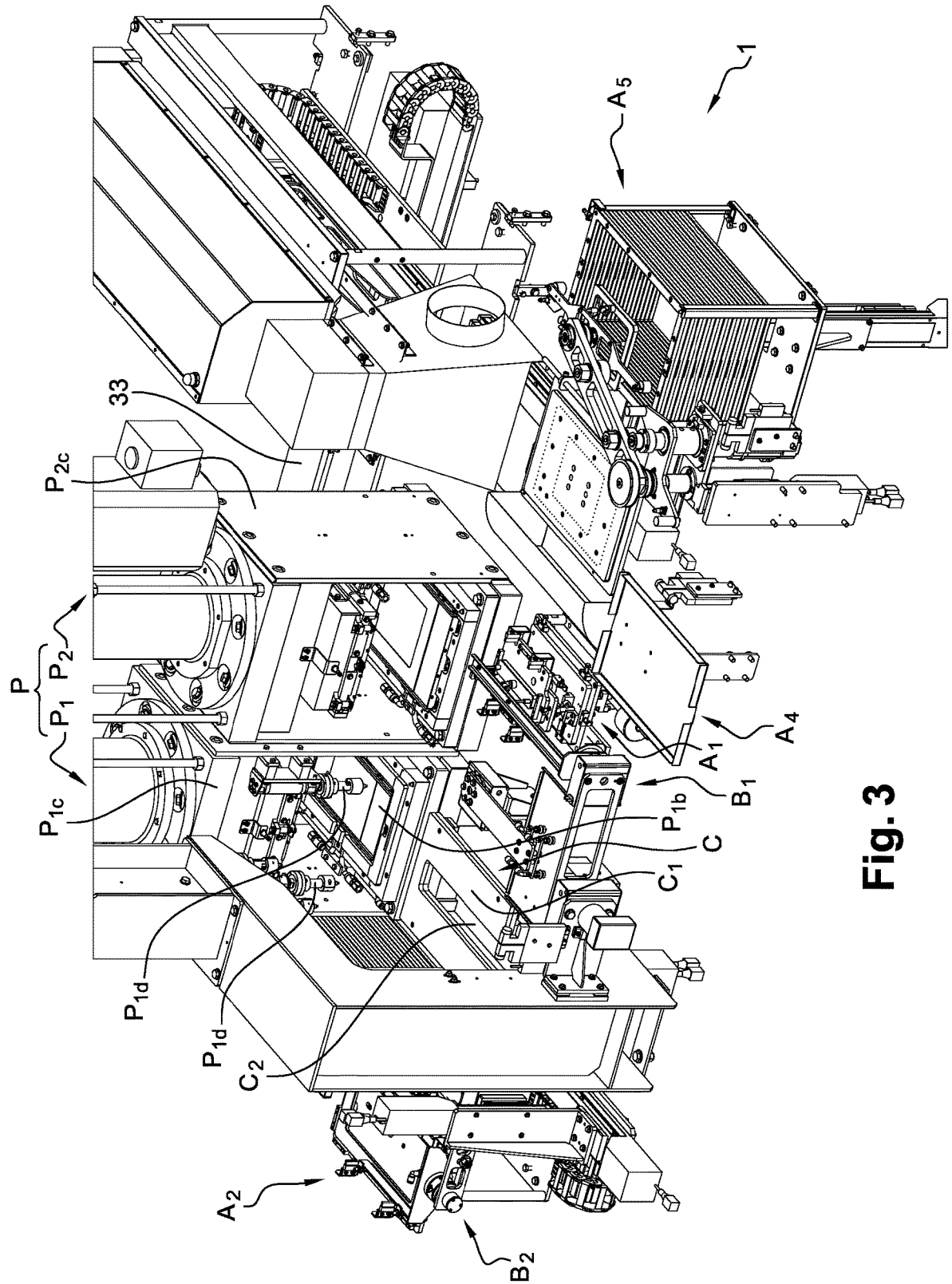
FIG. 3 is a perspective schematic view of the installation according to the invention.

First of all, reference is made to FIG. 1, which represents a polymer electrolyte membrane/electrodes assembly 10 called MEA, intended to be obtained with the installation described in reference to FIG. 3 and following, and comprising the successive elements from bottom to top:

- a first electrode 12 or lower electrode capable of forming an anode in a fuel cell,
- a first membrane 14 or lower reinforcing membrane comprising an inner edge 14b defining an opening 14a closed at the bottom by the first electrode 12, the outer edge 12a of the first electrode 12 being in contact with the inner edge 14b of the first reinforcing membrane 14,
- a polymer electrolyte membrane 16 ensuring proton conduction,
- a second membrane 18 or upper reinforcing membrane comprising an inner edge 18b defining an opening 18a,
- a second electrode 20 or upper electrode capable of forming a cathode in a fuel cell and at the top closing the opening 18a of the upper reinforcing membrane 18, the outer edge 20a of the second electrode 20 being in contact with the inner edge 18b of the second reinforcing membrane 18.

Each electrode membrane 12, 20 includes a first layer and a second layer separate from each other. The first layer is a diffusion layer formed of a carbon fabric whereon the second catalytic layer comprising a binder incorporating a catalyst such as platinum is deposited. In the arrangement shown, the second catalytic layer is arranged in contact with the polymer electrolyte membrane 16.

It should be understood that in FIG. 1, the different layers mentioned above are in contact with each other and that the gaps between said layers do not exist in a real assembly. Thus, the membrane/electrodes assembly is free of spaces or cavities inside it. In practice, the first electrode 12 and the second electrode 20 are each in contact with the polymer electrolyte membrane 16. As can be clearly seen in this figure, the polymer electrolyte membrane 16 has an outer edge 16a which is applied:

- at the top on the inner edge 14b of the first reinforcing membrane 14 so as to close its opening 14a at the top,
- at the bottom on the inner edge 18b of the second reinforcing membrane 18 so as to close its opening 18a at the top.

Thus, the polymer electrolyte membrane 16 is completely fitted between the first 14 and second 18 reinforced membranes and thus insulates the polymer electrolyte membrane from the cooling liquid and pure gas passages. This type of assembly is known as "anti-wicking". More precisely, the assembly presented in FIG. 1 includes a closed contour peripheral cutout 22 forming an outer contour of the electrolyte membrane—electrodes—reinforcing membranes assembly 10. The assembly 10 also includes holes 24 between said peripheral cutout 22 and the outer edge 16a of the polymer electrolyte membrane 16, these holes 24 being intended for the passage of cooling liquid and pure gases ($H_2$ and $O_2$). In other words, these holes 24 are formed in a peripheral zone surrounding the polymer electrolyte membrane 16 and the first 12 and second 20 electrodes.

Figure 2:
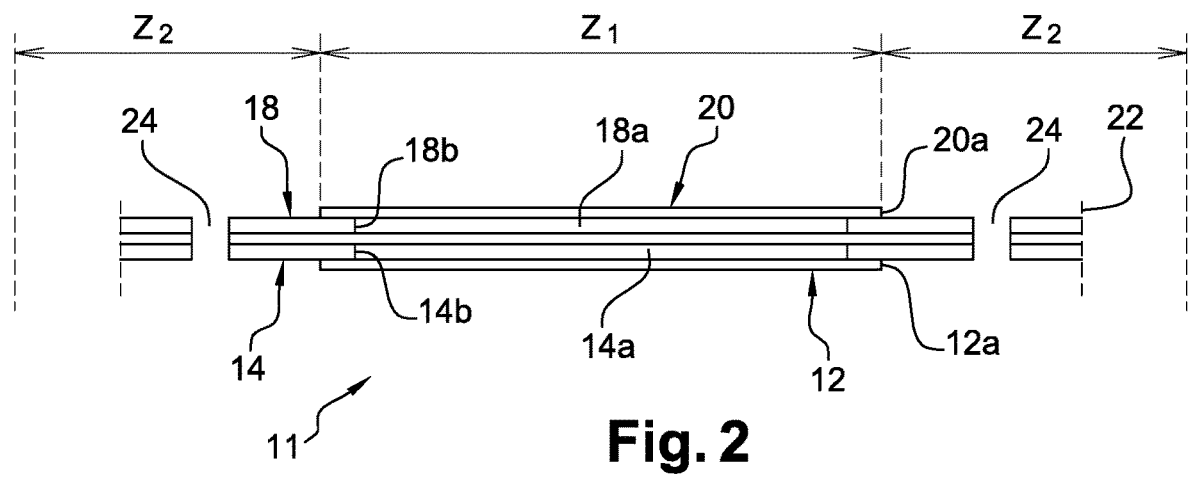
FIG. 2 is a schematic illustration of a second electrode-polymer electrolyte membrane/electrode assembly intended to be carried out with an installation according to the invention.

FIG. 2 shows a second assembly 11 that can be carried out with the installation described below. The stacking of the different membranes is identical to what has been described in reference to FIG. 1. However, the assembly shown in this figure does not perform an "anti-wicking" function, i.e. the polymer electrolyte membrane is not confined between the first 14 and second 18 reinforcing membranes as explained in reference to FIG. 1, but extends everywhere between the first reinforcing membrane 14 and the second reinforcing membrane 18. In practice, only the polymer electrolyte membrane 16 differs from the assembly 10 described in reference to FIG. 1.

Figure 6:
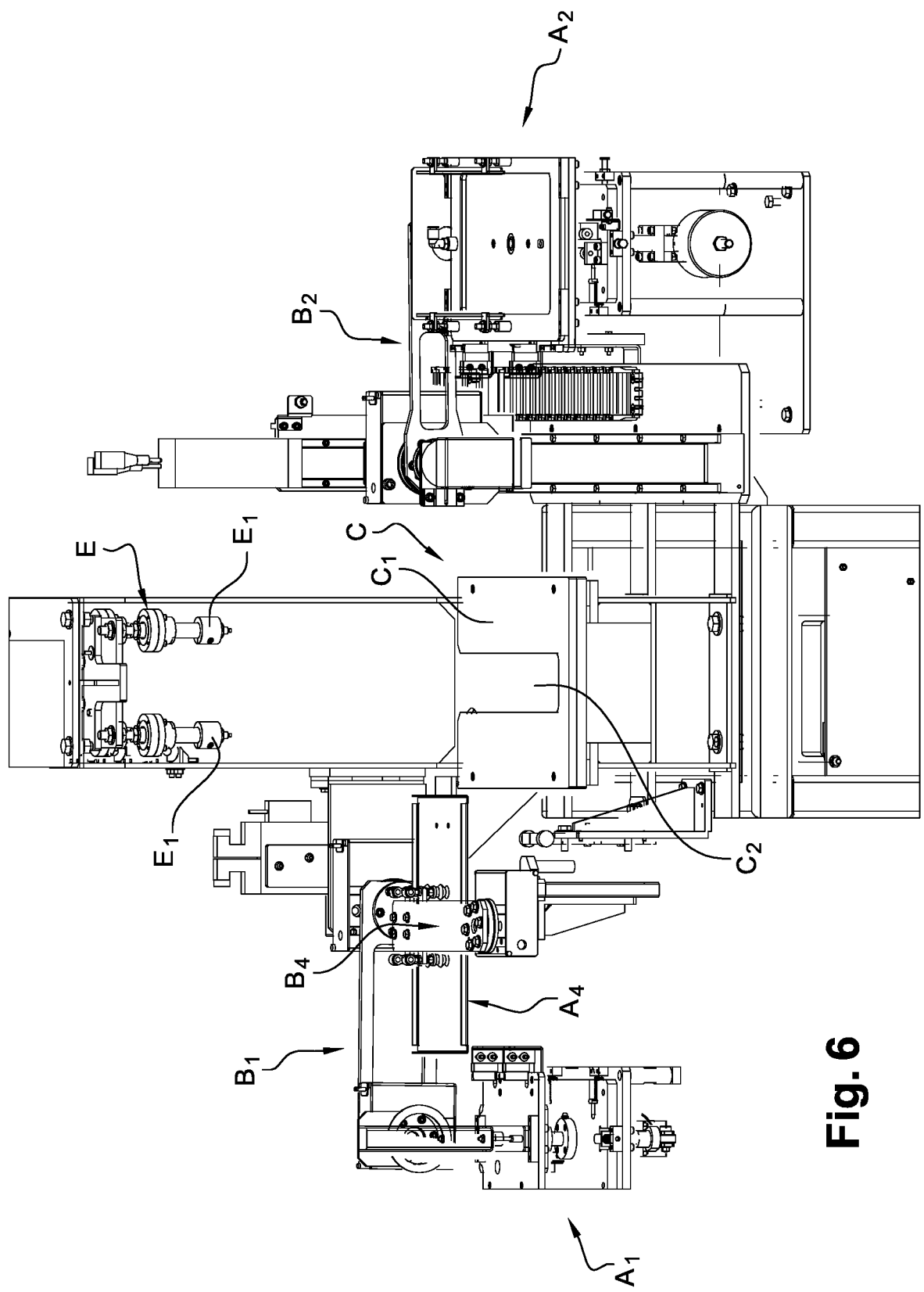
FIG. 6 is a schematic front view in perspective of several stations of the installation according to the invention, in particular one stacking station and two membrane storage stations arranged on either side of said stacking station.
Figure 7:
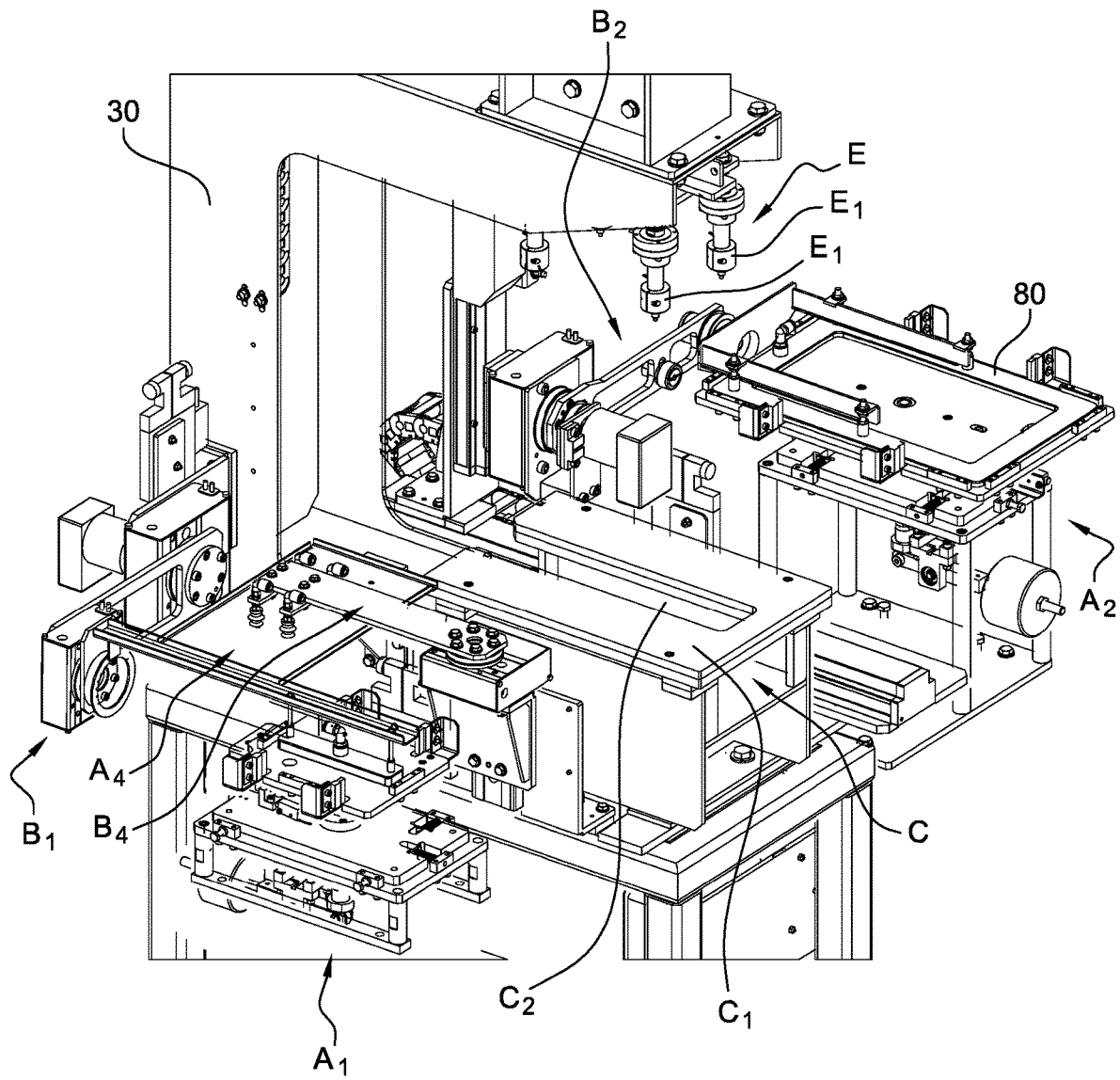
FIGS. 7 and 8 are schematic perspective views similar to FIG. 6 and along two different viewing angles.
Figure 8:
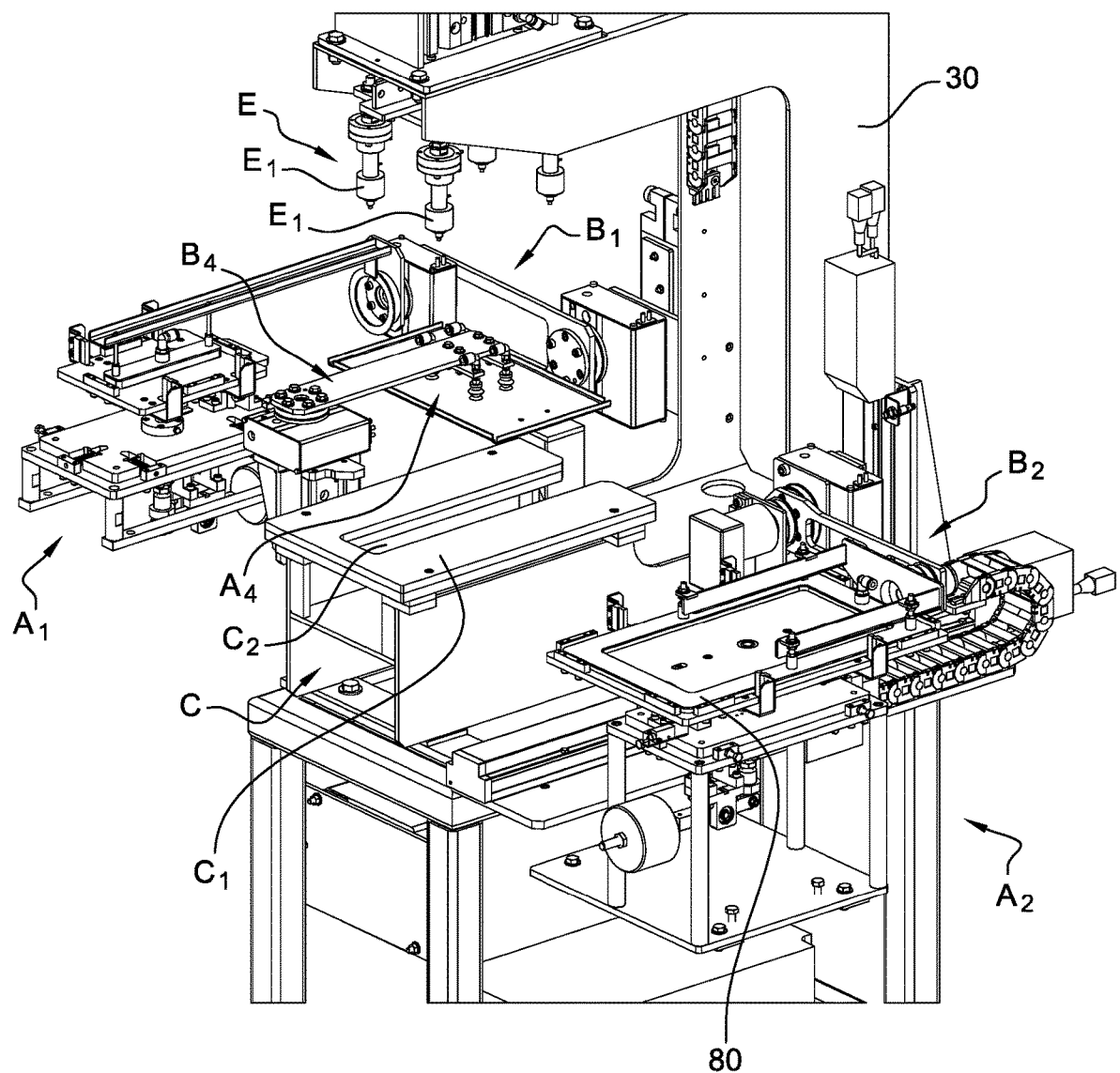

Reference is now made to FIGS. 3 to 8, which represent an installation according to the invention, with FIG. 8 being a graphical representation of the installation shown in FIGS. 3 to 7. The different units of the installation will now be described one after the other and positioned relative to each other in three perpendicular directions of the space perpendicular in pairs, namely two horizontal directions, one of which is a longitudinal direction L and the other a transverse direction T, and a vertical direction Z.

Figure 4:
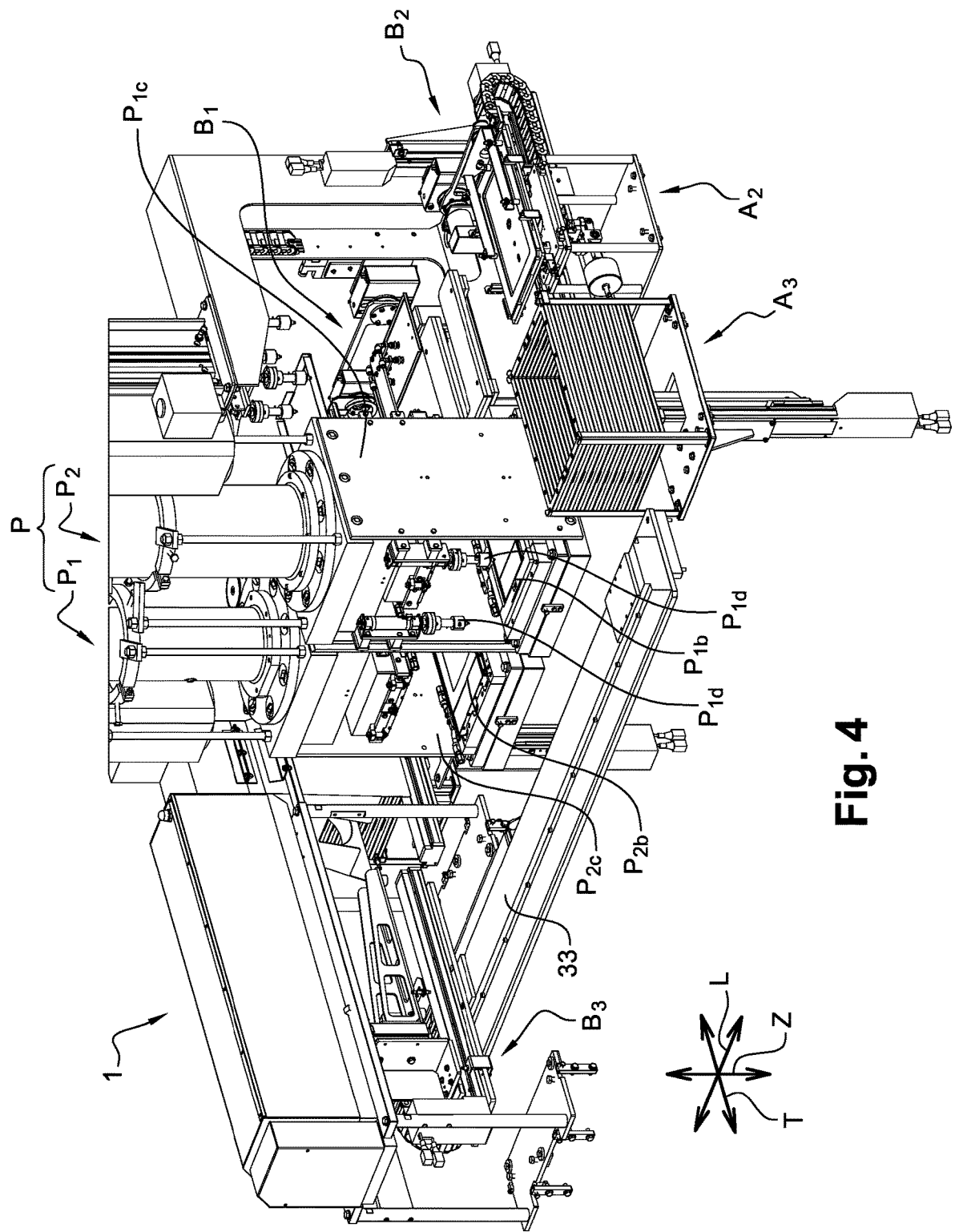
FIG. 4 is another perspective view of the installation according to the invention.
Figure 5:
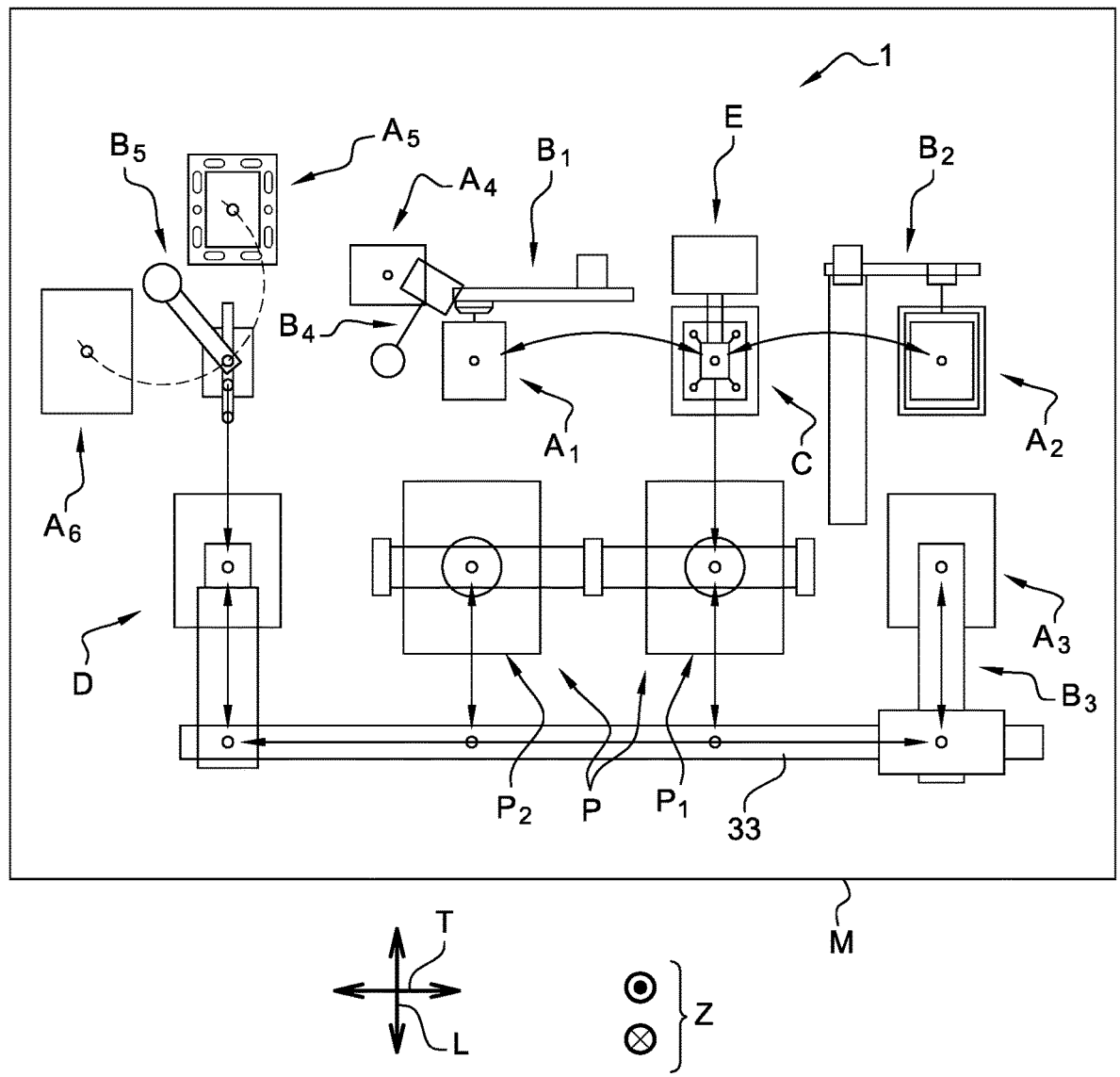
FIG. 5 is a schematic representation of the installation according to the invention

The installation 1 shown in FIGS. 3, 4 and 5 includes:

- a first station $A_1$ for storing electrode membranes 12, 20,
- a second station $A_2$ for storing reinforcing membrane,
- a third station $A_3$ for storing support membranes,
- a fourth station $A_4$ for storing separator sheets inserted between two successive electrode membranes 12, 20 of the first station $A_1$ for storing electrode membranes 12, 20,
- a fifth station $A_5$ for storing a final polymer electrolyte membrane—electrode membranes—reinforcing membranes assembly as described in reference to FIGS. 1 and 2,
- a sixth station $A_6$ for storing or recovering membrane waste,
- a station C for stacking or station for receiving the membranes from the first $A_1$ and second $A_2$ storage stations,
- a station P for pressing and heating a membrane assembly,
- a station D for cutting an assembly 10, 11 as described in reference to FIGS. 1 and 2,
- means for conveying and handling the membranes from the first station $A_1$, the second station $A_2$ and the third station $A_3$, a stack from the stacking station C, an assembly from the pressing and heating station P and the cutting station D.

The conveying and handling means include a plurality of manipulators i.e. five in the embodiment shown in the figures. Each manipulator includes means for gripping and placing a membrane or a plurality of membranes integral with each other.

A first manipulator $B_1$ is configured to enable an electrode membrane to move from the first storage station $A_1$ to the stacking station C. A second manipulator $B_2$ is configured to enable a reinforcing membrane 14, 18 to move from the second storage station $A_2$ to the stacking station C. A third manipulator $B_3$ is configured to enable a support membrane to move from the third storage station $A_3$ to the pressing and heating station P. A fourth manipulator $B_4$ is configured to enable a separator sheet to move from the first storage station $A_1$ to the fourth separator sheets storage station. A fifth manipulator $B_5$ is configured to enable a final assembly to move from the cutting station D to the fifth assemblies 10, 11 storage station $A_5$ and the membrane waste to move from the cutting station D to the sixth storage station $A_6$.

The installation 1 also includes means for securing E a stack at the stacking station C.

The pressing and heating station P consists of two presses $P_1$, $P_2$ arranged side by side in the longitudinal direction. The presses $P_1$ and $P_2$ each comprise a piston $P_{1a}$, $P_{2a}$ arranged to move in a vertical direction opposite a press support $P_{1b}$, $P_{2b}$, the pistons and press support being carried by a press frame $P_{1c}$, $P_{1c}$. The first press $P_1$ provides controlled pressing, heating and cooling of the lower electrode—polymer electrolyte membrane—upper electrode stacking zone $Z_1$, this zone $Z_1$ being shown in FIGS. 1 and 2. This zone $Z_1$ includes all the electrodes and preferably only these. The second press $P_2$ provides controlled pressing, heating and cooling of a membrane stacking zone $Z_2$ which is annular and surrounds the electrodes. This zone $Z_2$ is shown in FIGS. 1 and 2. This zone $Z_1$ includes all the electrodes and preferably only these.

The frame $P_{1c}$ of the press $P_1$ carries means for securing the membranes, in this case including heating punches $P_{1d}$ intended to be applied to the membranes.

As can be clearly seen in the figures, the stacking station C is arranged longitudinally between the first storage station A1 and the second storage station $A_2$. The pressing and heating station P is arranged here in the transverse direction T between the stacking station C and a longitudinal rail 33 enabling the longitudinal displacement of the third manipulator $B_3$. The interest of this arrangement in relation to a support $P_{1b}$ of the press $P_1$ which is accessible both ways of the transverse direction in order to enable the supply of a set of membranes from the stacking station C in a first direction of the transverse direction T on the support $P_{1b}$ of the press $P_1$ and a support membrane by the manipulator $B_3$, at the end of the displacement, in the other way of the transverse direction T, thus enabling to have an installation 1 with reduced dimensions, will be understood later.

The pressing and heating station P is arranged longitudinally between the cutting station D and the third storage station $A_3$, the latter being arranged transversely opposite the second storage station $A_2$. Also, the stacking station C is longitudinally interposed between the first storage station $A_1$ and the second storage station $A_2$.

The station E for cutting an assembly 10, 11 as described in reference to FIGS. 1 and 2, may include laser means confined inside a hood for extracting the fumes generated through the peripheral cutting 22 and the holes 24.

FIGS. 6 to 8 are now referred to, which represent a schematic view in perspective of the stacking station C, the first storage station $A_1$, the second storage station $A_2$ and the fourth storage station $A_4$. The stacking station C comprises a tray C1 comprising an opening $C_2$ more precisely in the form of a U-shaped notch the function of which will clearly appear later in the description made in relation to FIGS. 21 to 24 showing the embodiment of a first stacking according to the invention. In these FIGS. 6 to 8, the first manipulator $B_1$, the second manipulator $B_2$ and the fourth manipulator $B_4$ are clearly visible.

Figure 9:
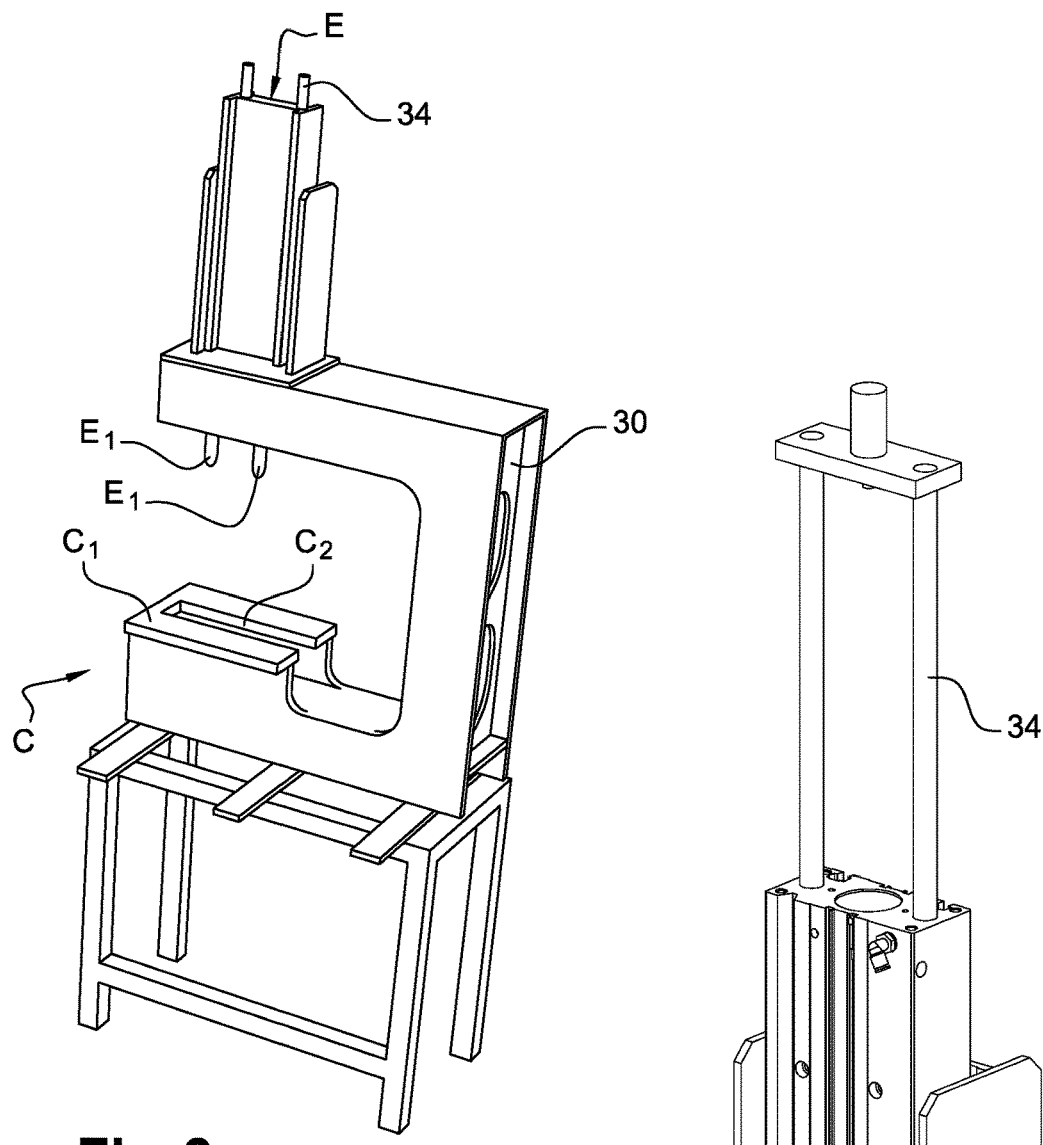
FIG. 9 is a schematic perspective view of the stacking station and the stack securing means.
Figure 10:
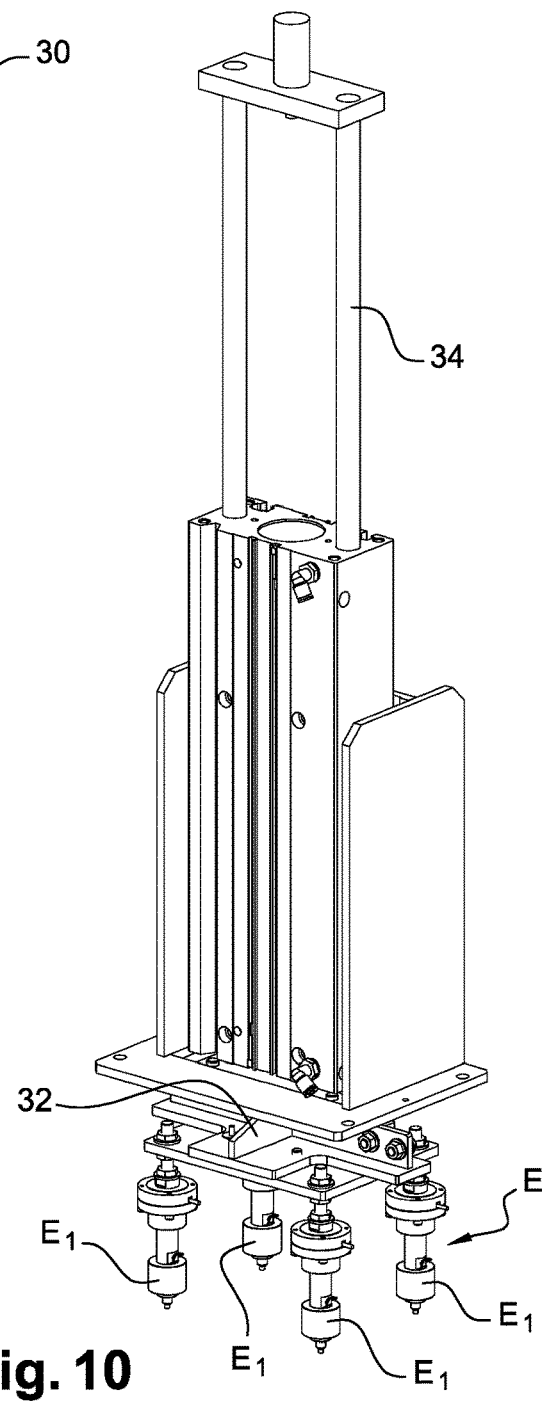
FIG. 10 is an isolated schematic view in perspective of the securing means

FIGS. 9 and 10 show, separately, the stacking station C comprising the stacking tray $C_1$ and the securing means E. The tray $C_1$ and said securing means E are carried by a stationary frame 30. The securing means E include heating punches $E_1$, for example four, enabling the welding of the membranes stacked on the stacking station C, such securing means E are carried by a base 32 secured to a slide 34 which can move in translation with respect to the support frame 30 with respect to the stacking tray $C_1$. To achieve the securing, the heating punches $E_1$ are moved until they come into contact with the stack of membranes positioned on the stacking station C. It should be understood that the punches $E_1$ support and heat the stack on the tray $C_1$. Securing is carried out between a reinforcing membrane 14, 18 and an electrode membrane 12, 20. In practice, this is done on the immediate periphery of the opening 14a, 18a with a reinforcing membrane 14, 18, preferably at the four corners of the opening 14a, 18a which has a rectangular shape.

Figure 11:
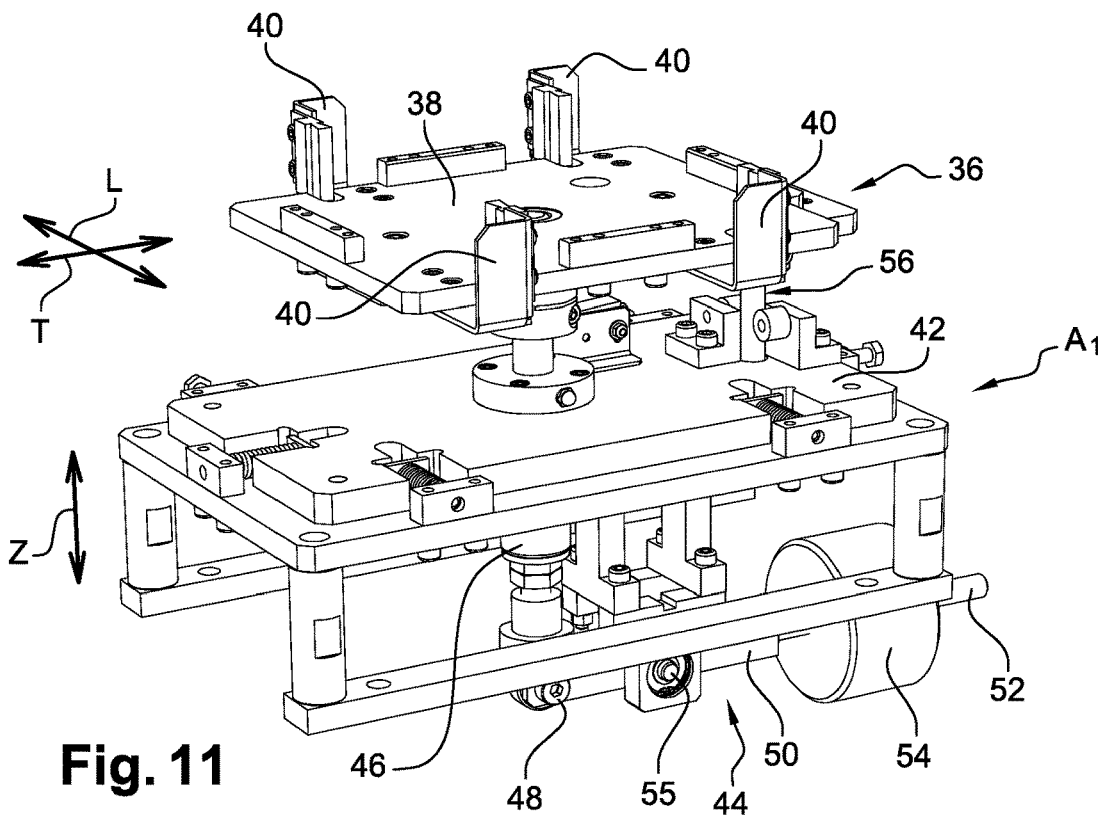
FIG. 11 is a schematic perspective view of a first electrode membranes storage station.
Figure 12:
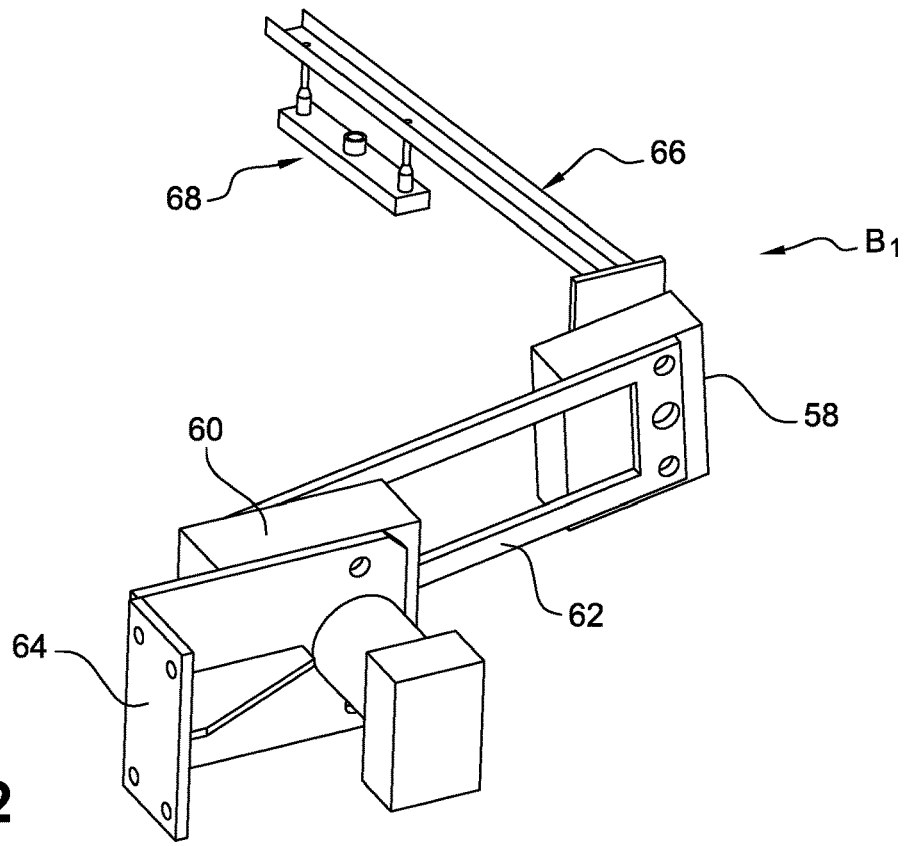
FIG. 12 is a schematic perspective view of a first manipulator of the electrode membranes.
Figure 14:
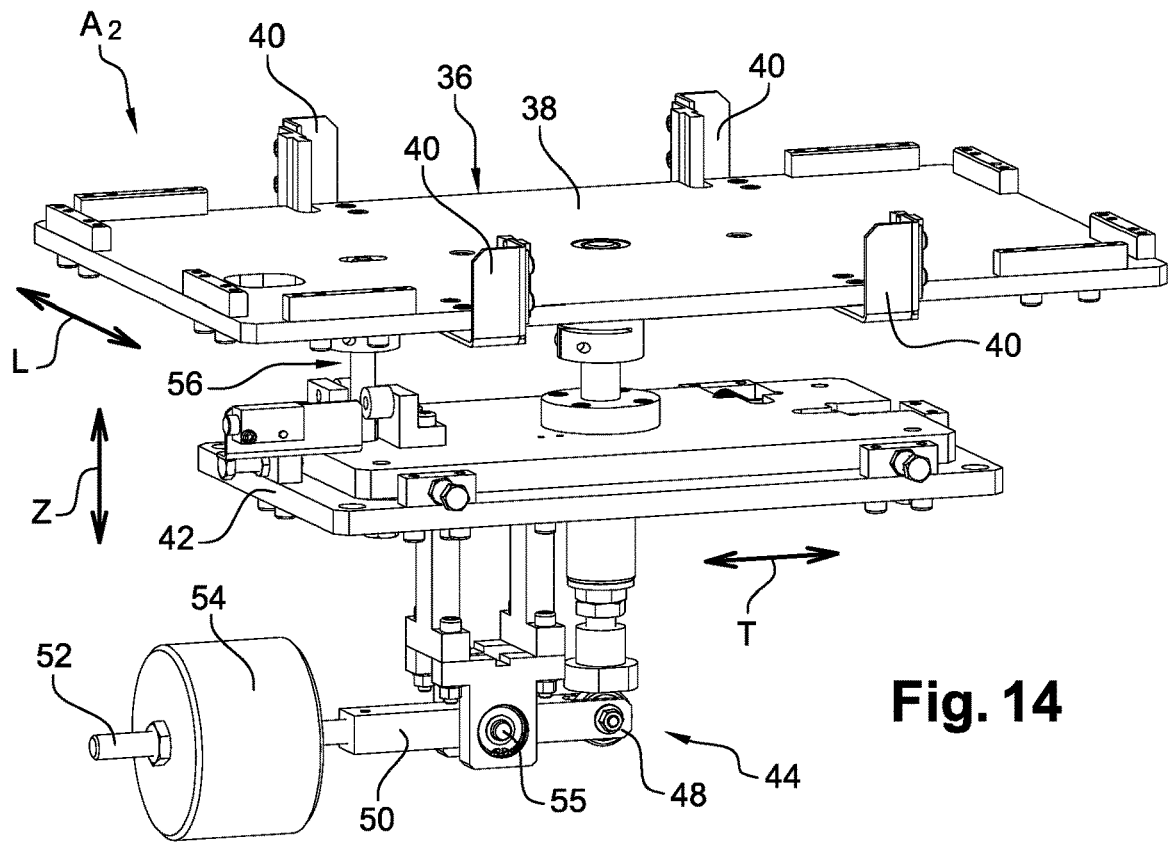
FIG. 14 is a schematic perspective view of a second reinforcing membrane storage station.

FIGS. 11 and 12 represent the first electrode membranes 12, 20 storage station $A_1$ and the first electrode membranes 12, 20 manipulator $B_1$. The first storage station $A_1$ includes an electrode membranes 12, 20 stack storage magazine 36 comprising a tray 38 intended to receive a stack of electrode membranes 12, 20. The edge of the tray 38 is equipped with means for positioning the electrode membranes 40 in a predetermined position. These placing means 40 are formed by edges positioned in the format of electrodes 12, 20. The electrode 12, 20 storage magazine 36 is guided to move in a given vertical direction Z on a stationary frame 42 carrying damping and return means 44 of the unit in a predetermined position in the absence of a bearing force exerted on the unit in said direction by the first manipulator $B_1$. For this purpose, a vertical connecting rod 46 rigidly connects the tray 38 of the magazine 36 at its upper end and is rotatingly hinged at its lower end to a first end 48 of a lever 50 an opposite second end 52 of which carries a counterweight 54. The first end 48 and the second end 52 of the lever 50 are separated by a pivot 55 integral with a stationary tray 42. As can be seen in FIG. 14, the connecting rod 46 passes through the stationary tray 36 and is guided with a vertical translation through an opening in it. Thus, the stationary tray 42 is inserted between the magazine 36 and the lever 50.

Preferably, the magazine 36 is also connected to the stationary tray 42 by additional vertical translation guide means 56 of the unit to compensate for vertical translation guide errors resulting from the sliding of the rod 46 into the opening of the stationary tray 42.

The first manipulator arm B1 advantageously comprises a first rotating joint 58 and a second rotating joint 60 connected to each other by a connecting segment 62. The two joints 58, 60 are here articulated and rotated along axes parallel to each other and extending in a transverse direction T. The first joint 58 is mounted on the frame 64 of the installation and on a first end of the segment 62 so as to articulate these relatively to each other about a first axis of rotation. The second joint 58 is mounted on the second end of the segment and on one end of a support 66 elongated in a direction parallel to the axes of rotation and carrying means for gripping and placing a membrane. These gripping and placing means 68 include suction gripping means which, in the case of the first station, advantageously include suction cups aligned in a transverse direction T and connected to vacuum supply means.

Figure 22:
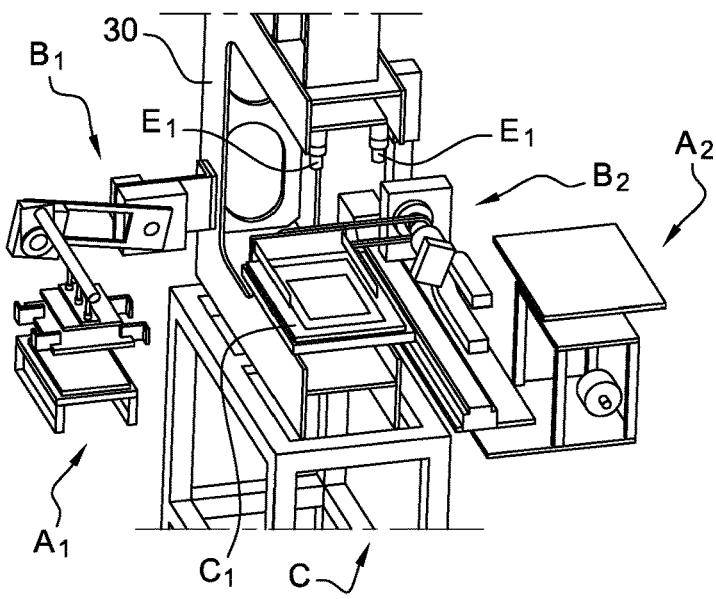
FIGS. 22 to 24 represent the steps of making a second stack of membranes.
Figure 23:
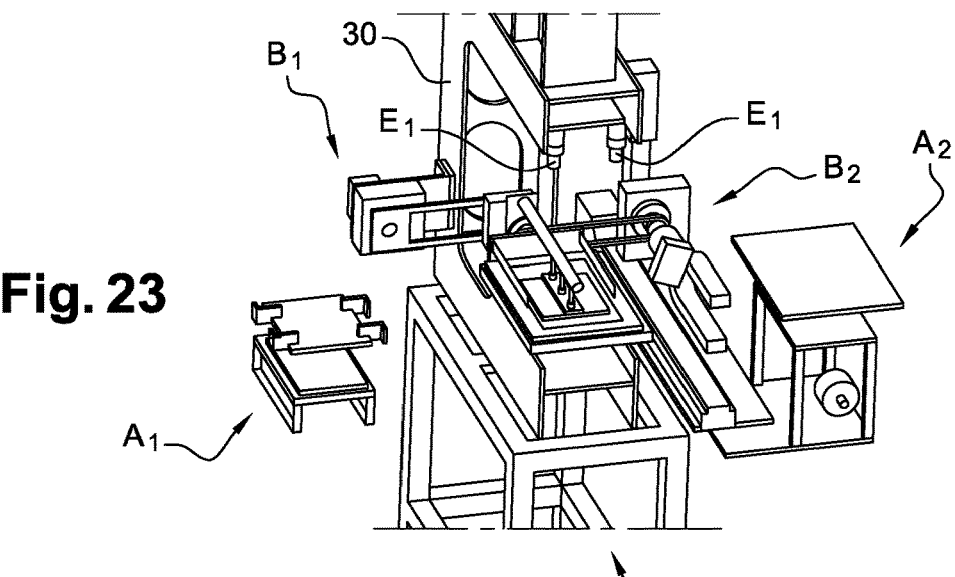
Figure 24:
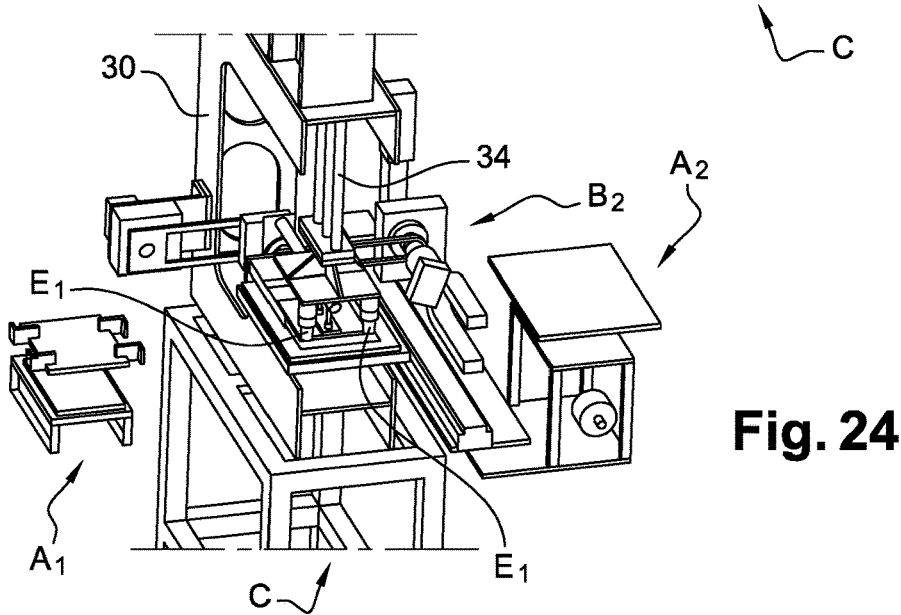

In operation, the first manipulator $B_1$ is capable of moving between a position in which an electrode membrane 12, 20 is taken from the electrode magazine 36 and a position in which an electrode membrane 12, 20 is placed on the tray of the stacking station C. Advantageously, a placing position corresponds to a position in which the electrode membrane 12, 20 is arranged in contact with the tray $C_1$ or another membrane as it will appear later, the gripping means 68 being maintained in the active state to ensure that the electrode is maintained. In practice, the first manipulator $B_1$ includes a first placing position and a second placing position for an electrode membrane 12, 20 on the tray $C_1$ of the stacking station C. In the second placing position, the first manipulator $B_1$ moves an electrode membrane 12 from the first storage station $A_1$ to the tray $C_1$ of the stacking station C without turning over the electrode membrane 12. In the first placing position, the first manipulator $B_1$ causes a second displacement of an electrode membrane 20 from the first storage station $A_1$ to the tray $C_1$ of the stacking station C with the turning over of the electrode membrane 20. In this first position, the elongated suction cup support 66 is fitted in the notch $C_2$ of the stacking tray $C_1$ as shown in FIG. 22 and as this will become clearer in relation to the description of the operation of the installation performed with reference to FIGS. 21 to 27. Also, this type of movement of the first manipulator B1 enables a simple stacking of the electrode membranes 12, 20 in the same way in the first storage station $A_1$, with their first sides facing upwards so that it can be used as a gripping face while enabling an orientation of the second side carrying the catalyst downwards or upwards at the stacking station.

Figure 13:
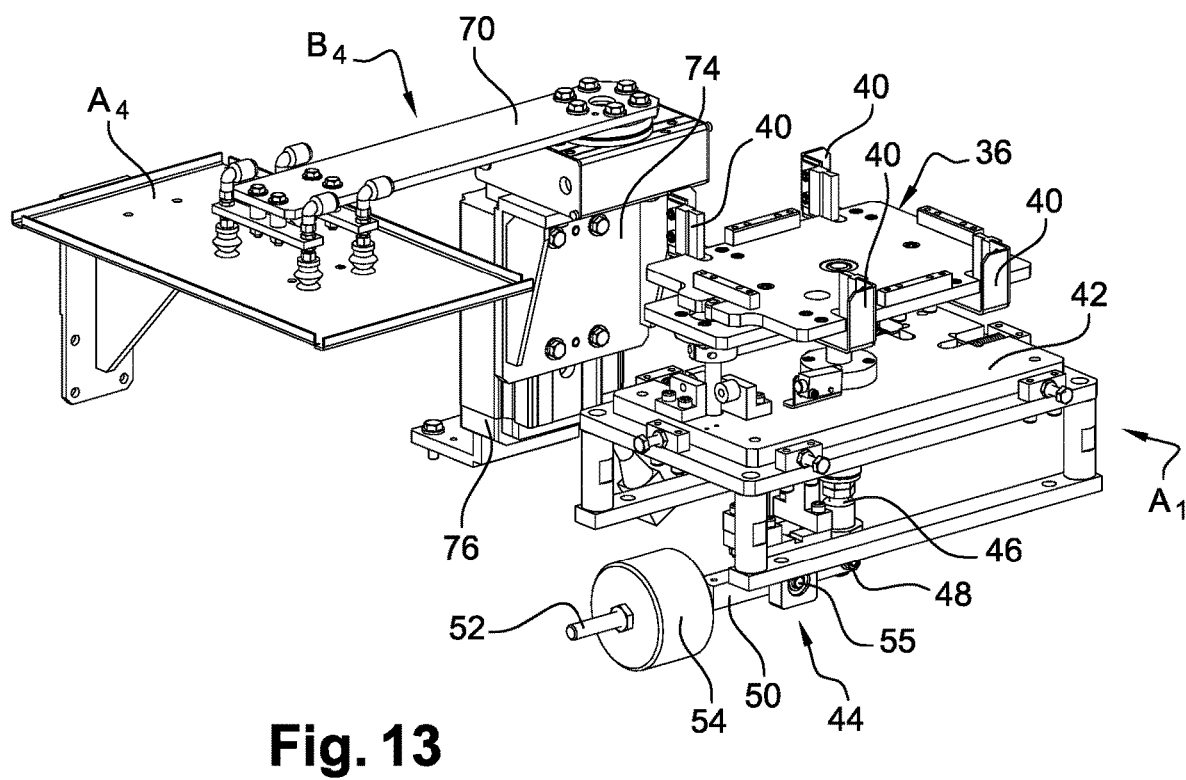
FIG. 13 is a schematic perspective view of the first station and a separator sheet manipulator.

FIG. 13 shows the fourth manipulator $B_4$ comprising a segment 70 carrying at one end means 72 for gripping and placing a separator sheet, these means also comprising suction cups 72 connected to vacuum supply means. The segment 70 of the fourth manipulator B4 is rotatingly articulated at its end opposite the suction cups 72 on a support 74 that can be moved vertically in relation to the frame 76 of the installation. The fourth manipulator $B_4$ thus enables in operation a gripping of a separator sheet and its supply to the fourth storage station $A_4$ of separator membranes.

Figure 15:
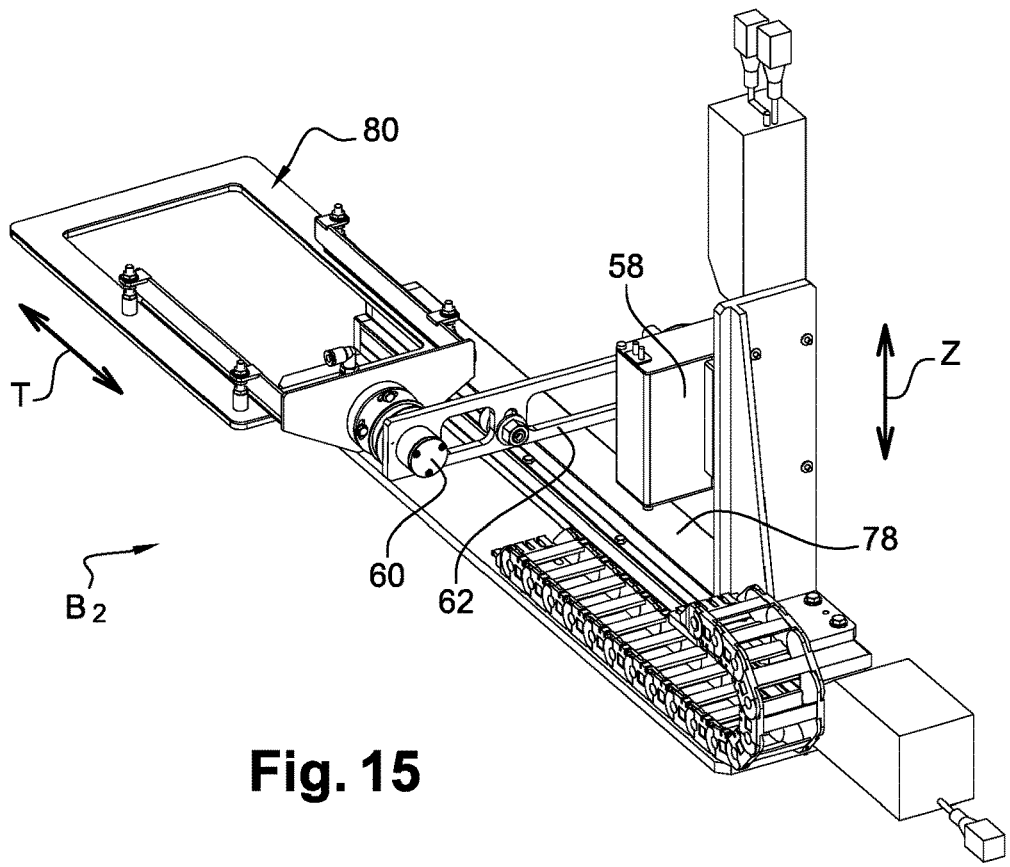
FIG. 15 is a schematic perspective view of a second reinforcing membrane manipulator.

FIG. 14 represents the second reinforcing membranes 14, 18 storage station $A_2$ which is very similar to the first storage station $A_1$ described in reference to FIG. 11. It will not be described again. The second manipulator $B_2$, visible in FIG. 15, also includes two rotating joints 58, 60 with axes parallel to each other. Unlike the first manipulator $B_1$, the second manipulator $B_2$ includes a translational displacement 78 means such as a rail sliding in the transverse direction. Also, the second rotating joint 60 carries gripping and placing means comprising suction gripping means which are, in this case, formed by a rigid frame 80 having a flat gripping face having a plurality of perforations connected to vacuum supply means. Unlike the first manipulator $B_1$, the second manipulator $B_2$ is configured to perform a displacement movement of a membrane or a set of several membranes secured to each other from the second station $A_2$ to the tray $C_1$ of the stacking station C without turning over the membrane or said set of membranes.

Figure 16:
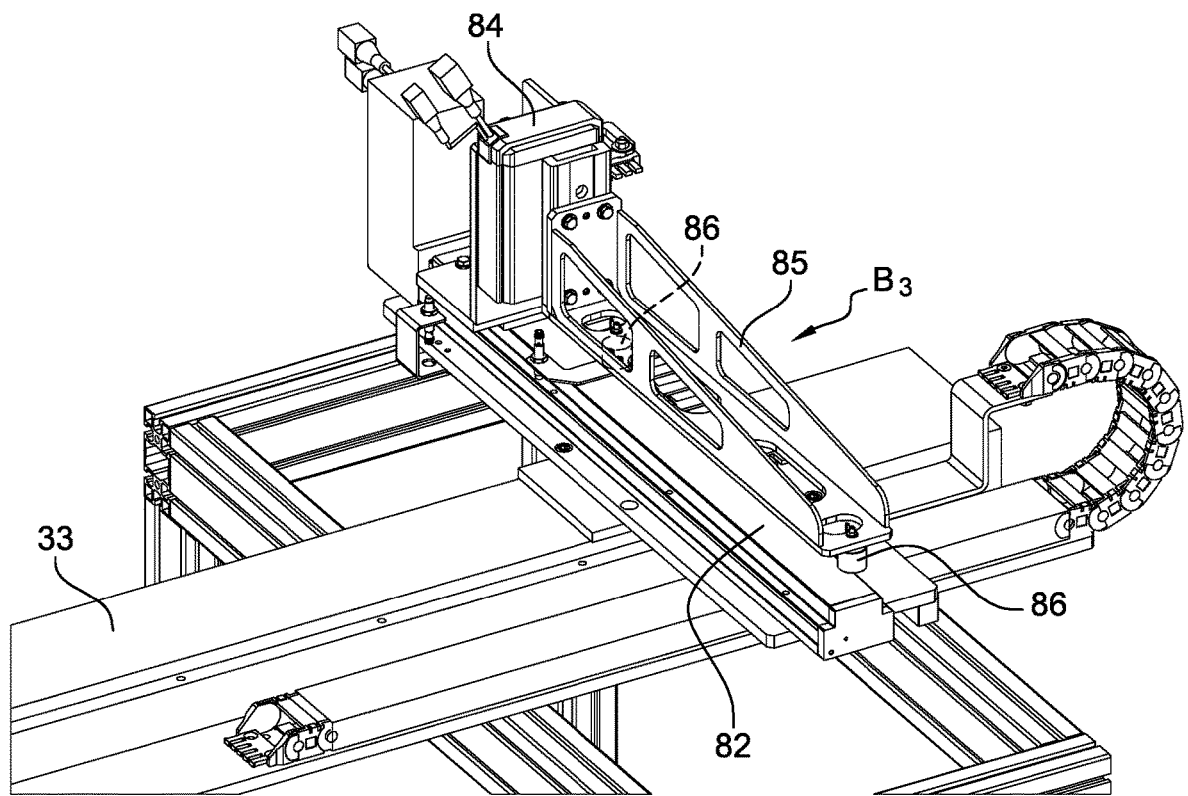
FIG. 16 is a schematic perspective view of a third manipulator mounted on a longitudinal travelling rail.
Figure 17:
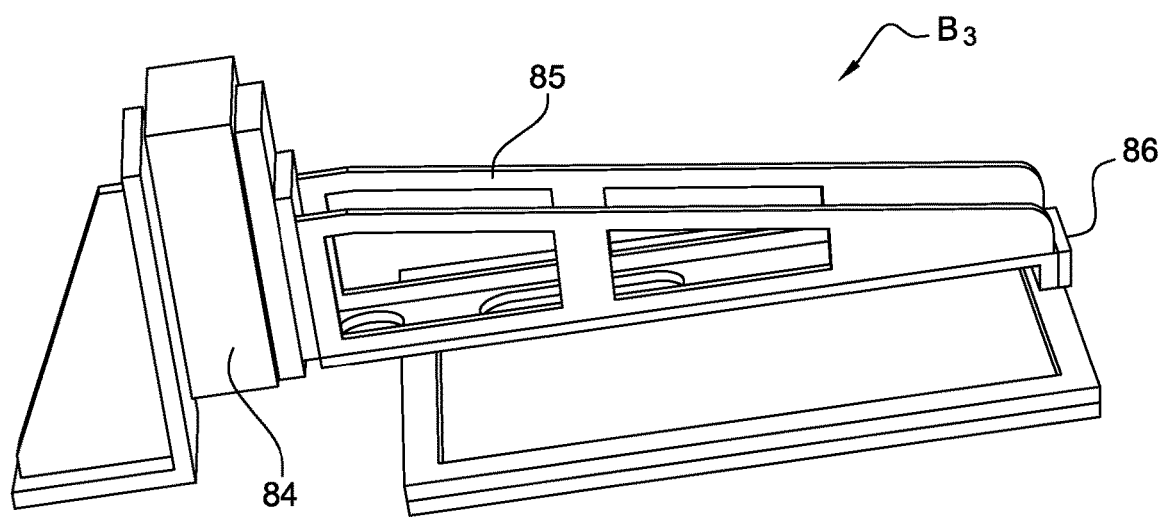
FIG. 17 is a schematic perspective view of the third manipulator of FIG. 16.
Figure 18:
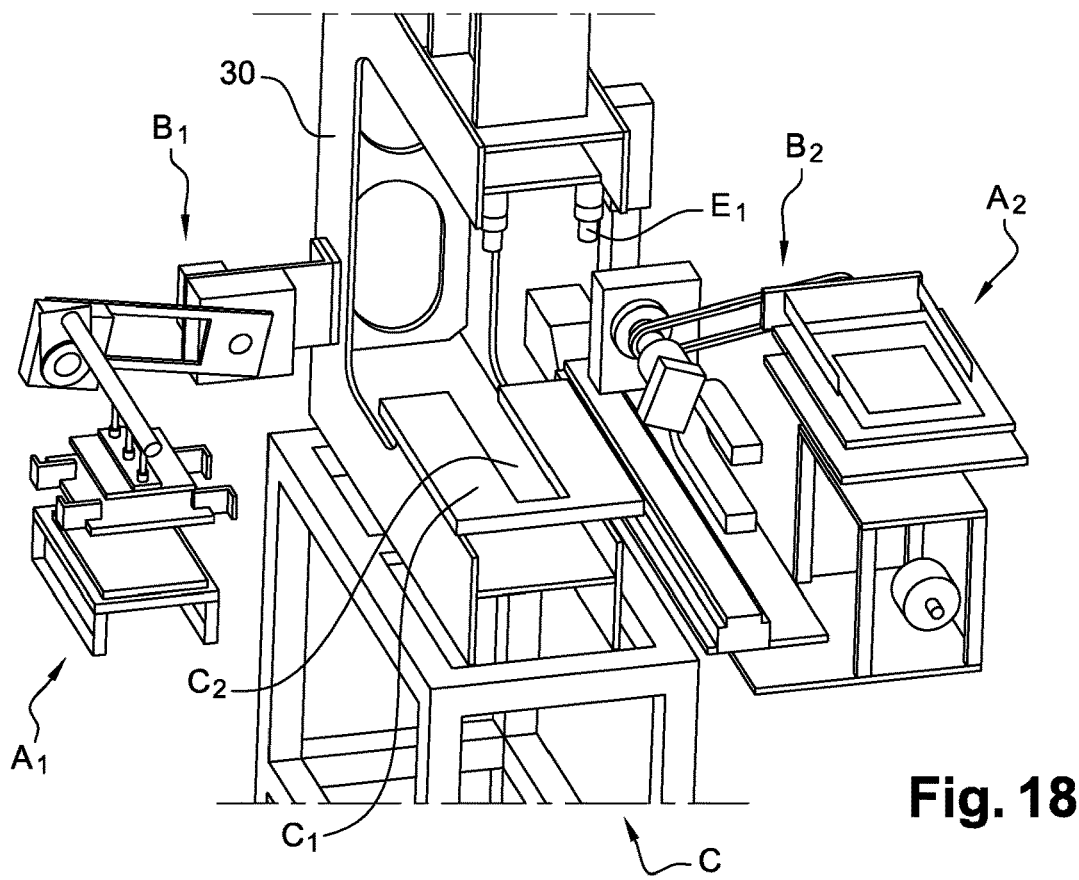
FIGS. 18 to 21 represent the steps of making a first stack of membranes.
Figure 19:
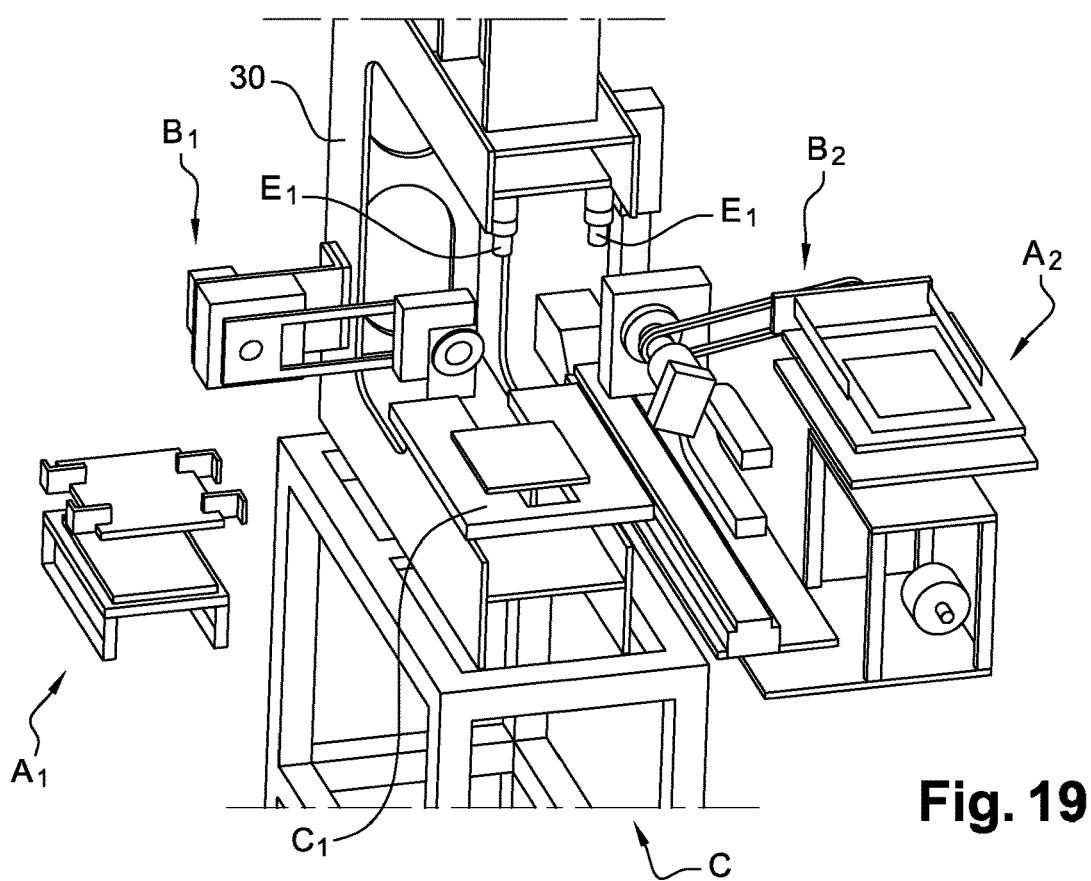
Figure 20:
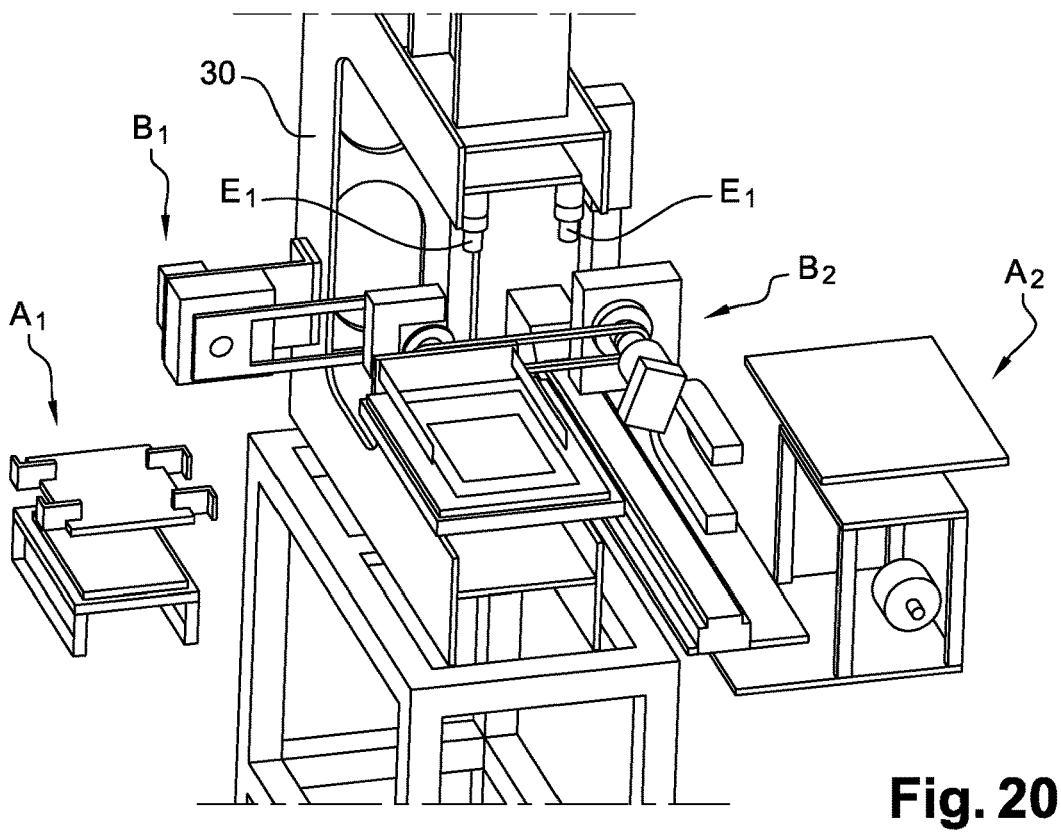
Figure 21:
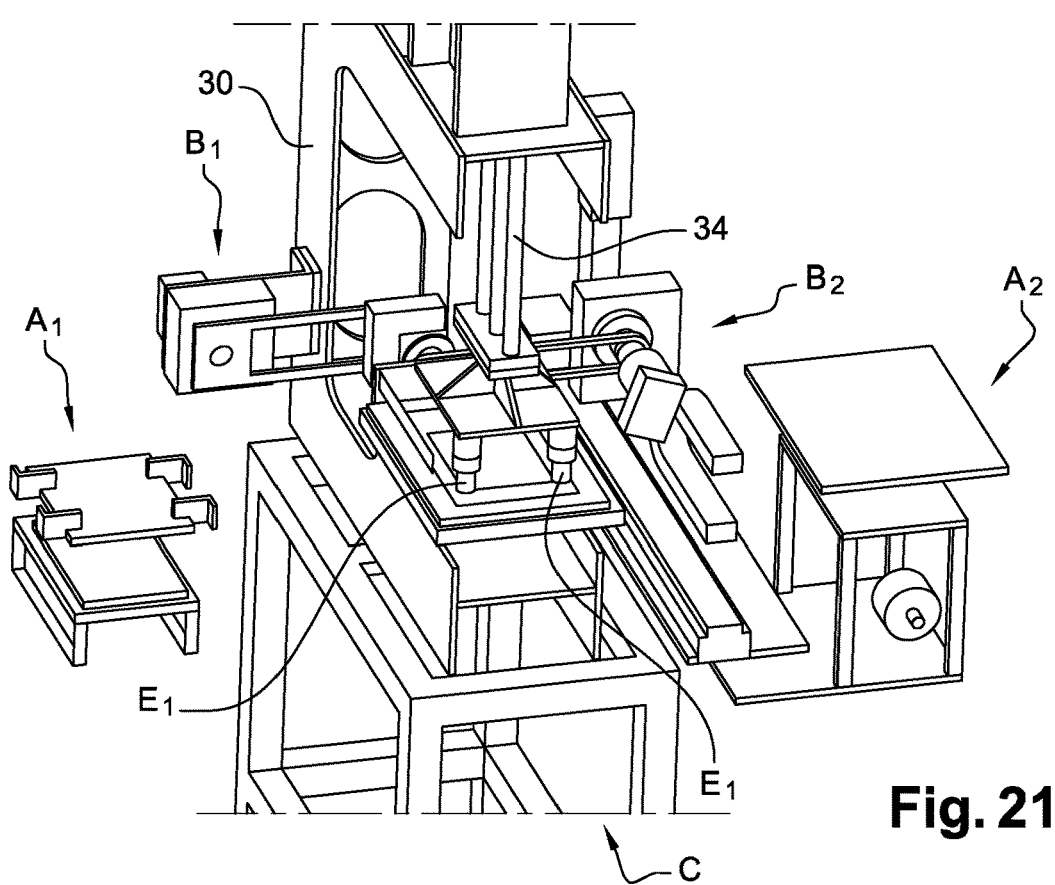

FIGS. 16 and 17 show the third manipulator $B_3$ comprising a transverse translation rail 82 mounted on the longitudinal rail 33. The transverse rail 82 carrying a vertical rail 84 secured to a support 85 extending in the transverse direction. In this way, the third arm $B_3$ can move in the three longitudinal X, transverse T and vertical Z directions of the space. The support 85 of the third arm $B_3$ carries magnetic gripping and placing means 86 including electromagnets activated by installation control means. These gripping and placing means are capable of gripping a metal frame from the third storage station A3 and bringing it under the first press $P_1$.

The fifth manipulator $B_5$ is shown in FIG. 5 and includes gripping and placing means including suction gripping means and magnetic gripping means enabling the displacement of a metal frame, in order to enable the storage of the polymer electrolyte membrane—electrode assemblies at the fifth storage station and of the metal frames at the sixth station.

The installation 1 according to the invention can advantageously be used so as to enable the production of an assembly 10 according to FIG. 1 or an assembly 11 according to FIG. 2, depending on the mode of supply of the second and third stations as has been described.

In order to obtain the assembly 10 described in reference to FIG. 1, the first storage station, the second storage station and the third storage station shall be supplied as follows:

the first storage station $A_1$ comprises a stacking in a vertical direction of electrode membranes 12, 20 the first diffusion layer of which is arranged upwards, the second storage station A2 comprises an alternation of first reinforcing membranes 14 comprising an opening 14a and second reinforcing membranes 18 comprising an opening 18a, each second reinforcing membrane 18 being secured to a polymer electrolyte membrane 16 which closes its opening and which is arranged opposite a first reinforcing membrane 12, the polymer electrolyte membrane 16 being sized so that its outer edge 16a is inscribed between the inner edges 14b, 18b and the outer edges of the first 14 and second 18 reinforcing membranes, the third storage station $A_3$ comprises support membranes 26 comprising an outer edge 26a and an inner edge 26b delimiting an opening 26c of the membrane 26, this opening 26c being sized so that the polymer electrolyte membrane 16 can fit into said opening 26c and that the first reinforcing membrane 14 and the second reinforcing membrane 18 can cover the entire inner edge 26b of the support membrane 26 (FIGS. 25 and 26), each support membrane 26 being able to be clamped by its outer edge 26a between two metallic portions 28a, 28b forming a frame 28 for holding the support membrane 26 and enabling the handling thereof by the magnetic gripping means 86 of the third manipulator $B_3$ at least one of the portions 28a, 28b being metallic, the two portions 28a, 28b being possibly metallic.

Figure 25:
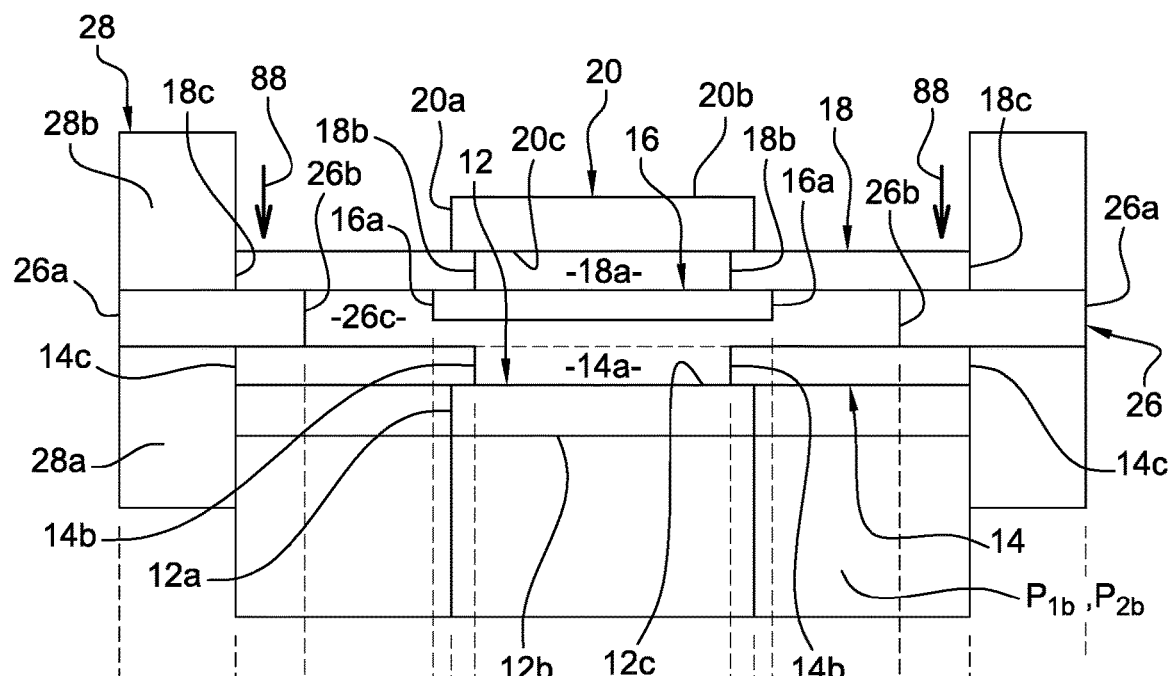
FIG. 25 is an illustration of a method of stacking membranes to obtain the assembly shown in FIG. 1.
Figure 26:
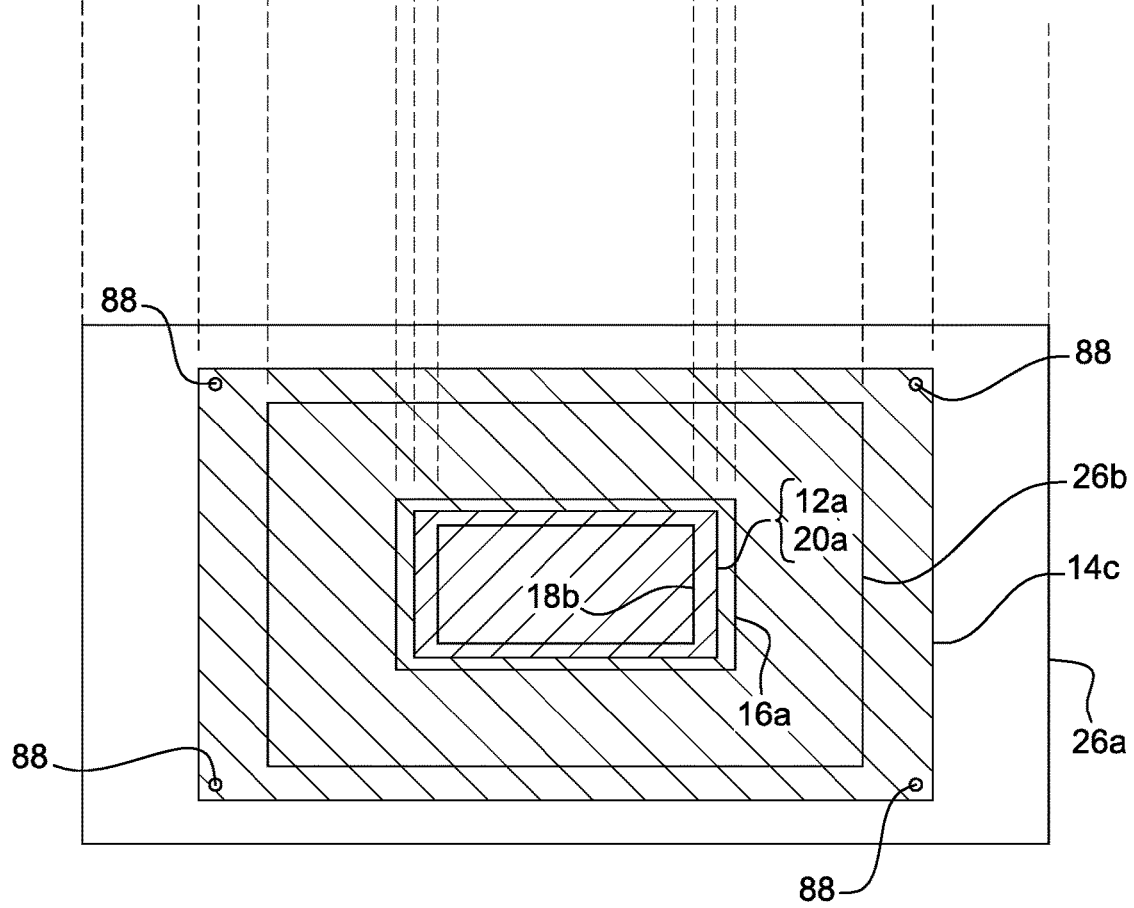
FIG. 26 is a schematic illustration of the contours of the elements in FIG. 25.
Figure 27:
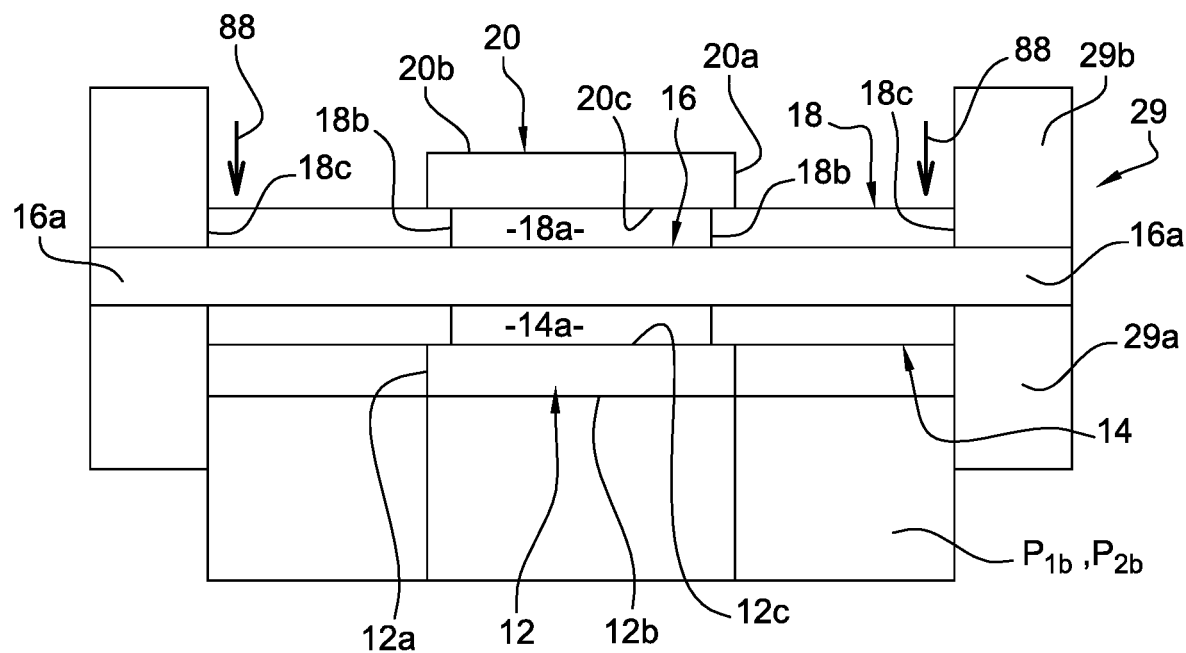
FIG. 27 is an illustration of a method of stacking membranes to obtain the assembly shown in FIG. 2.

As shown in FIGS. 18 to 24, the first manipulator $B_1$ is operated so as to grip a first electrode 12 by its diffusion layer and then position the first manipulator arm $B_1$ in its first placing position on the stacking station C, with the second layer of the first electrode 12 facing upwards. In a second step, the second manipulator $B_2$ moves a first reinforcing membrane 14 alone from the second storage station $A_2$ to the stacking station C so that the opening 14a of the first reinforcing membrane 14 is closed at the bottom thereof by the first electrode 12. In a third step, the first electrode membrane 12 and the first reinforcing membrane 14 are secured together using the securing means E arranged at the stacking station C. It should be noted that the suction gripping means of the first arm $B_1$ and the second manipulator $B_2$ are kept active during the securing stage so that each membrane is secured to its manipulator. In a fourth step, the assembly thus formed is moved from the stacking station C to the press support $P_{1b}$ using the second manipulator $B_2$, the suction gripping means of the first manipulator $B_1$ being rendered inactive whereas the suction gripping means of the second manipulator $B_2$ are kept in the active state so as to enable the displacement of the two membrane assembly. In a fifth step, a support membrane 26 enclosed in a metal frame 28 is brought, by means of the third manipulator $B_3$, onto the assembly formed by the first electrode 12 and the first reinforcing membrane 14, the inner edge 26b of the support membrane 26 being applied to the outer edge 14c of the first reinforcing membrane 14. In a sixth step, a sample is taken using the second manipulator $B_2$ from an assembly of a second reinforcing membrane 18 and a polymer electrolyte membrane 16, these membranes 16, 18 having previously been secured to each other. This assembly is moved on the tray $C_1$ of the stacking station C in a seventh step and a second electrode 20 is brought, in an eighth step, from the first storage station $A_1$ to the stacking station c using the first manipulator $B_1$ so that it closes the opening $18_a$ of the second reinforcement 18 at the top, the first manipulator $B_1$ being in its second placing position. It should be noted that the suction gripping means of the first arm $B_1$ and the second manipulator $B_2$ are kept active during the securing stage. In a ninth step, the second electrode membrane 20 and the second reinforcing membrane 18 are secured together using the securing means E arranged at the stacking station C. In a tenth step, the assembly thus formed is moved from the stacking station to under the press $P_1$ so that the outer edge of the second reinforcing membrane 18 covers the entire inner edge of the support membrane. This step is carried out using the second manipulator $B_2$, the suction gripping means of the first manipulator $B_1$ being rendered inactive whereas the suction gripping means of the second manipulator $B_2$ are kept in the active state in order to enable the displacement of all the membranes. The set thus formed is shown in FIGS. 25 and 26. In an eleventh step, a controlled pressing, heating and cooling operation is carried out in zone $Z_1$ (shown in dotted hatches in FIG. 26) to secure the electrode membranes 12, 20 with the reinforcing membranes 14, 18 and avoid any relative movement of the membranes with respect to each other. The eleventh step of compressing and heating the electrodes can be followed by a step of securing the reinforcing membranes 14, 18 by the heating punches $P_{1d}$ for example in a plurality, for example four, of locations 88 located at the periphery of the reinforcing membranes 14, 18 (FIGS. 25 and 26). This step can also be initiated at the end of the compression and heating cycle and ended simultaneously or after it. In other words, the step of securing by heating punches $P_{1d}$ precedes the step of heating and compressing the annular zone $Z_2$. This securing step prevents the lower reinforcing membrane 14 from buckling and folding back into itself, leading to the formation of a double thickness of the reinforcing membrane 14 inducing the assembly 10 to be discarded for non-conformity. In a twelfth step, the third manipulator $B_3$ moves the assembly 10 onto the support $P_{2b}$ of the press $P_2$ and a controlled pressing, heating and cooling operation is performed in zone $Z_2$ (shown in solid line hatching in FIG. 26). In a thirteenth step, the assembly is moved to the cutting station to make the peripheral edge 22 and holes 24 and then the assemblies 10 are collected at the fifth station $A_5$ and the metal frames 28 as well as membrane remains at the sixth station $A_6$.

It should be noted that it is possible to obtain the above-mentioned assembly with the polymer electrolyte membrane being secured to the first reinforcing membrane. In this case, it must be ensured that the first reinforcing membrane 14 and the first electrode 12 are secured before being placed on the support $P_{1b}$ of the press $P_1$ by contacting the heating punches $E_1$ with the electrode 12 directly and not with the polymer electrolyte membrane 16 to avoid any thermal damage of the latter.

In order to obtain the assembly 11 described in reference to FIG. 2, the first storage station, the second storage station and the third storage station shall be supplied as follows:
the first storage station $A_1$ comprises a stacking in a vertical direction of electrode membranes 12, 20 with a diffusion layer being arranged upwards,
the second storage station $A_2$ comprises a plurality of reinforcing membranes 14, 18 each comprising one opening,
the third storage station $A_3$ comprises a stack of support membranes 12 each formed by a polymer electrolyte membrane 16 the outer edge 16a of which is clamped between two portions 29a, 29b of a metal frame (FIG. 27) forming a frame for holding the polymer electrolyte membrane 16 and enabling the manipulation thereof by the magnetic gripping means 86 of the third manipulator $B_3$. It should be noted that only two opposite parts of the outer edge of the support membrane or polymer electrolyte membrane can be clamped between these two parts of the frame. When the polymer electrolyte membrane is rectangular in shape, said two parts may be two opposite straight parts, for example those of the two parts of said edge having the smallest dimensions.

The same steps one to thirteen as described above are carried out, only the polymer electrolyte membrane 16 serving as the support membrane for the assembly and its handling via the frame of the first press $P_1$ to the second press $P_2$ and later. Of course, the sixth step described above differs here since the second manipulator only then takes a sample of a second reinforcing membrane 18 and not of an assembly formed by a second reinforcing membrane 18 and a polymer electrode 16 since the supply of the second $A_2$ storage station is different.

It should be noted that using an elongated support 66 for the first arm makes it possible to limit the size of the U-shaped notch $C_2$ on the tray $C_1$.

In order to optimize the speed of execution of an MEA assembly, the installation includes means for controlling the conveying and handling means (FIG. 5), these control means being configured so that the departure of a stack from the stacking station C to the pressing and heating station P is followed by a new stacking step on the stacking station C. Thus, as mentioned above, the control means are so configured as to:
ensure that a first stack is made on the stacking station and then moved to a pressing and heating station,
ensure that a second stack is made on the stacking station and then moved to said pressing and heating station, and
pressing and heating said first and second stacks.

Figure 28:
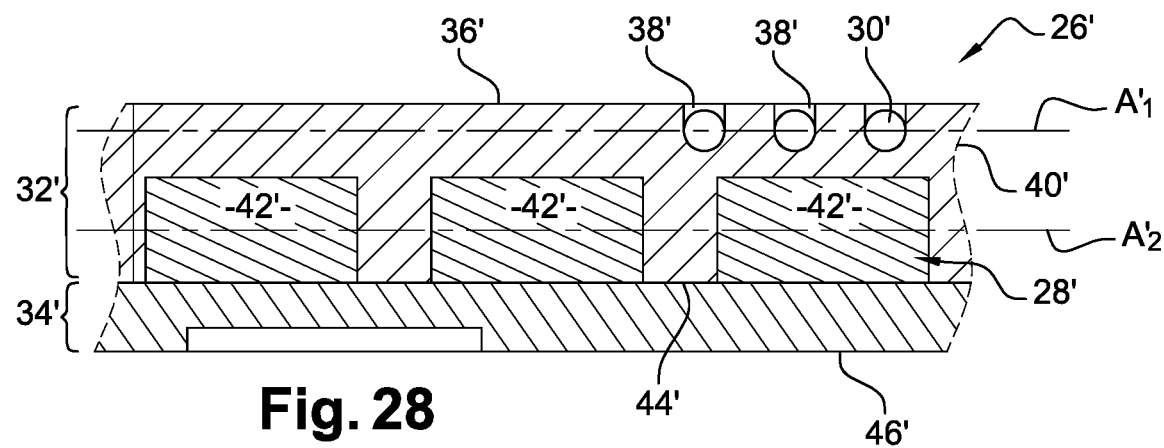
FIG. 28 is a schematic sectional view of a heating and cooling tray according to the invention.

FIG. 28 shows a heating and cooling tray 26' comprising a cooling liquid flow circuit 28' and a heating cord 30' formed in the thickness of the tray 26'. The term "tray" in the expression "heating and cooling tray" refers here to a substantially parallelepipedic element having at least first and second dimensions perpendicular to each other which are larger than a third dimension perpendicular to the first and second dimensions.

This tray 26' includes a first plate 32' and a second plate 34' applied one on top of the other. The first plate 32' carries the cooling circuit 28' and the heating cord 30'. This first plate 32' includes a first face 36' including at least one groove 38' housing a heating cord 30', the groove 38' being formed to extend over said first face 36' and to include a first end leading to a flank 40' of the first plate 32'. This first plate 32' also includes at least one groove 42' formed on a second face 44' opposite the first face 36'. This groove 42' leads, preferably to a flank 40' of the first plate 32'. The groove(s) 42' is/are closed by the second plate 34'. It is understood that the first face 36' of the first plate 32' forms a first face of the tray 26', the second face 46' of which is formed by the face of the second plate 34' opposite the first plate 32'.

As can be seen in FIG. 28, the heating cord 30 is arranged as close as possible to the first face 36' of the tray 26' in order to achieve optimal heat transfer to a compression plate to be applied to this first face 36'. The heating cord 30' can be matted in the groove 38' by means of a nickel wire for example. In addition, the heating cord 30' extends in a first plane A1' and the cooling channel extends in a second plane A2' which are parallel to each other and to the first 36' and second 46' face of the tray 26'. The cooling channel 28' is inserted between the heating cord 30' formed in the first face 36' of the tray 26' and the second face 46' of the tray 26'.

In order to achieve a good conduction of heat in the heating cord 30' and the cold in the cooling system, the first plate 32' is advantageously made of a good thermal conductor material and capable of withstanding high compressive forces. Thus, the first plate 32' is advantageously made of a material, for example metal, having a thermal conduction coefficient of at least 100 W/m/K and a Young's modulus of at least 100 GPa. A good example of a material is copper, which has a thermal conductivity coefficient of 390 W/m/K and a Young's modulus of 124 GPa. Brass would also be suitable since it has a thermal conductivity coefficient of 120 W/m/K and a Young's modulus of 100 to 130 GPa.

Each heating cord 30' is preferably of the resistive type, the ends of each cord 30' being connected to power supply means. Also, temperature sensors can be provided in the first plate 32' and extend into the first plate 32' from the entrance of a groove 38' of the first plate.

Figure 29:
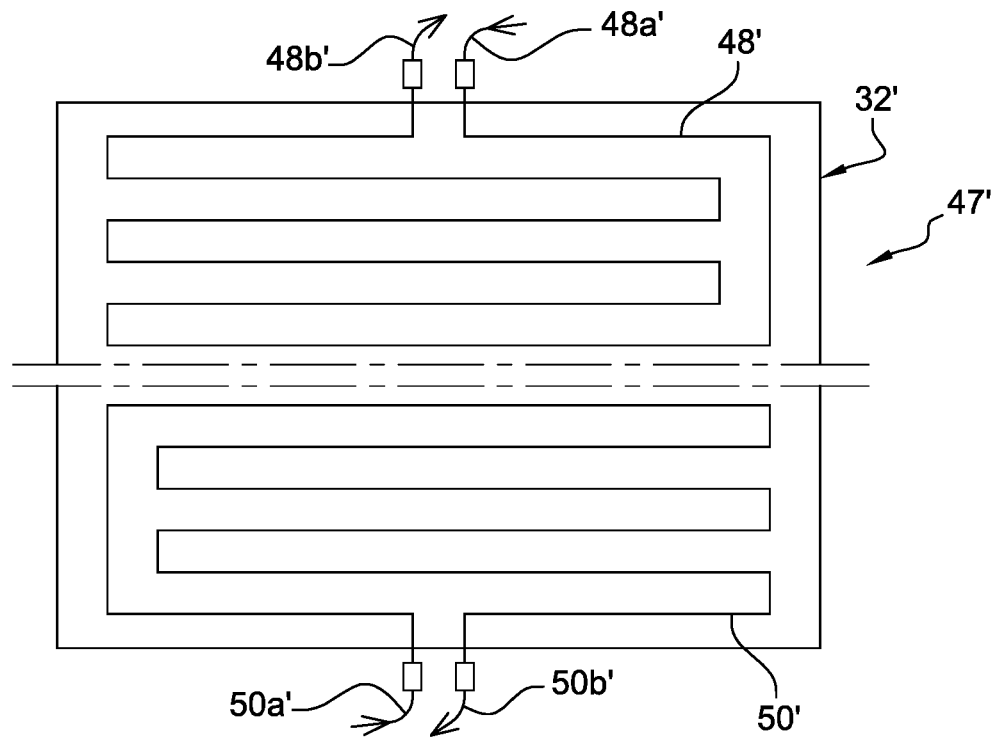
FIG. 29 is a schematic view of a first embodiment of a cooling circuit for a heating and cooling tray.

As shown in FIG. 29, in a first embodiment of a tray 47', the first plate 32' may comprise a first groove 48' and a second groove 50' formed on the second face 44' of the first plate 32' and forming independent cooling liquid circulation channels, each channel 48', 50' including a liquid inlet 48a', 50a' and an outlet 48b', 50b' in the tray. The first plate 32' could still include four fluidly independent channels. In order to allow a good distribution of cold and heat, each of the cooling channel(s) and groove(s) is of the coil type. To obtain a good transfer of frigories in the first plate 32', it is desirable that the distance along a channel 48', 50' from input 48a', 50a' of each of the channels 48', 50a' to the center of the first plate 32' is less than the distance along the channel from output 48b', 50b' of each of the channels 48', 50' to the center of the tray 26'. This promotes a circulation of the liquid to the center and then to the rest of the first plate 32', which allows a better smoothing of the heat of the plate 32'.

It should also be noted that the first plate 32' could be formed by the association, i.e. the juxtaposition, edge to edge, of two half plates, each comprising a cooling circuit as described above.

Figure 30:
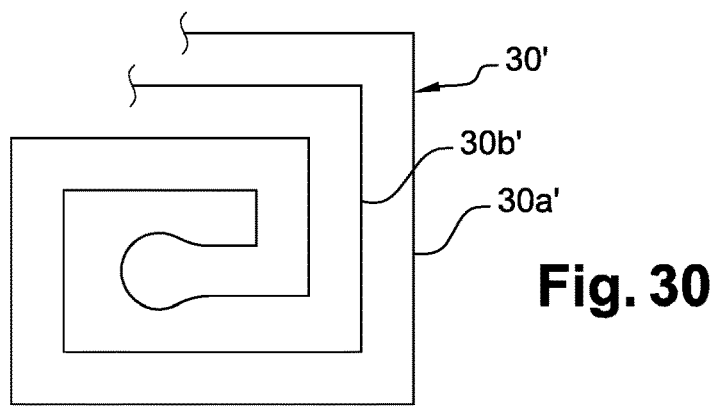
FIGS. 30 and 31 are schematic views of a second embodiment of a cooling circuit for a heating and cooling tray.

FIG. 30 represents a possible shape of a heating cord 30' for use with a cooling circuit described above, such as that shown in FIG. 29 for example. The cord 30' is here arranged in the form of two spirals 30a', 30b' interlocked inside each other, the inner ends of the two spirals being connected to each other.

Figure 31:
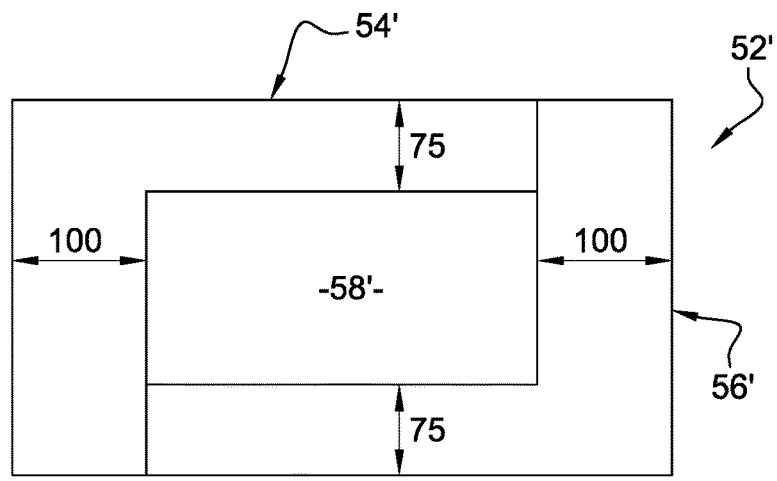
Figure 32:
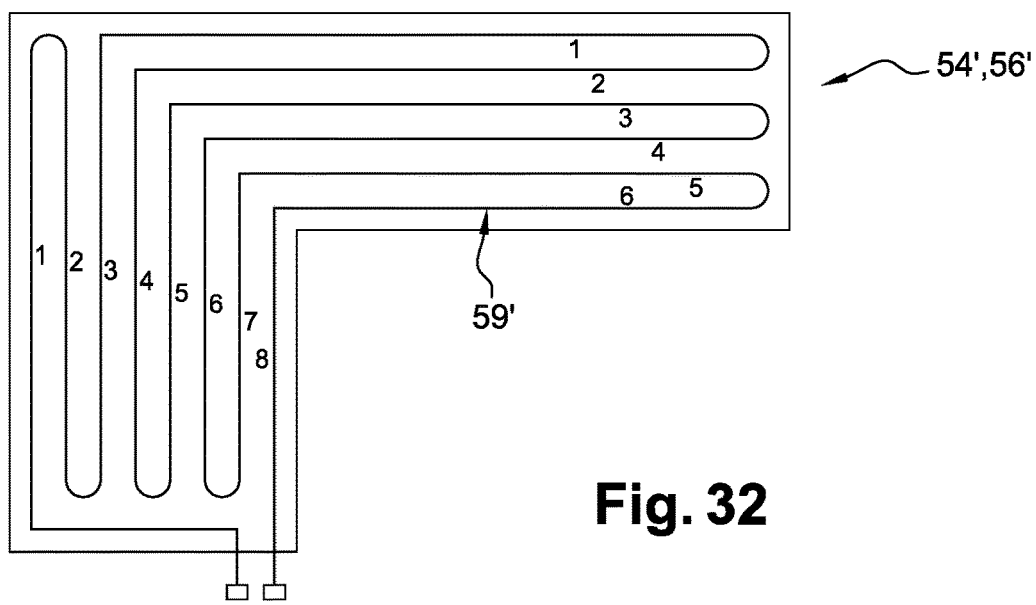
FIG. 32 is a schematic cross-sectional view of the heating means for a heating and cooling tray.
Figure 33:
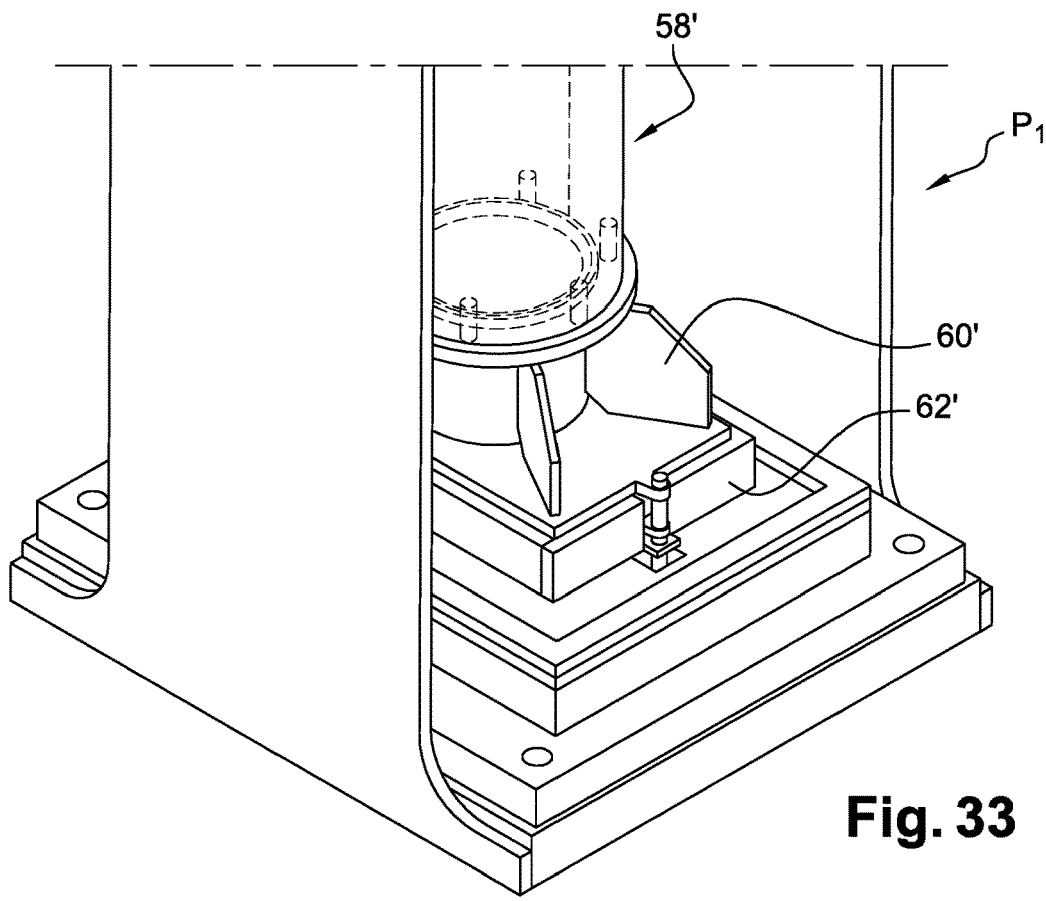
FIGS. 33 to 36 represent a first embodiment of a press comprising a heating and cooling tray.
Figure 34:
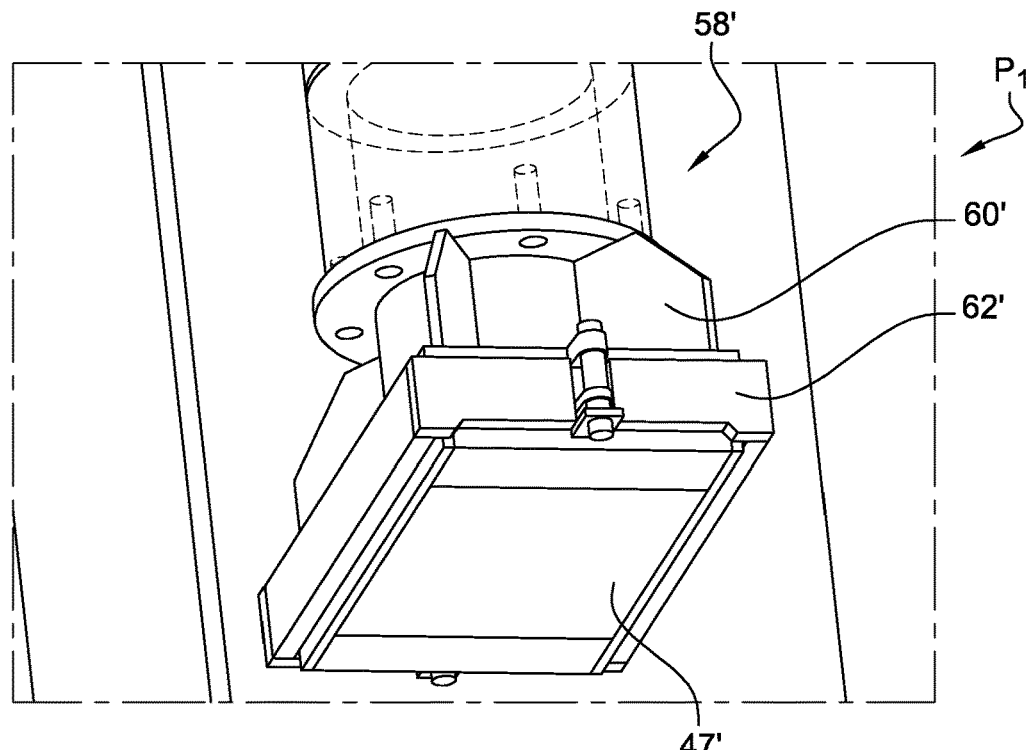
Figure 35:
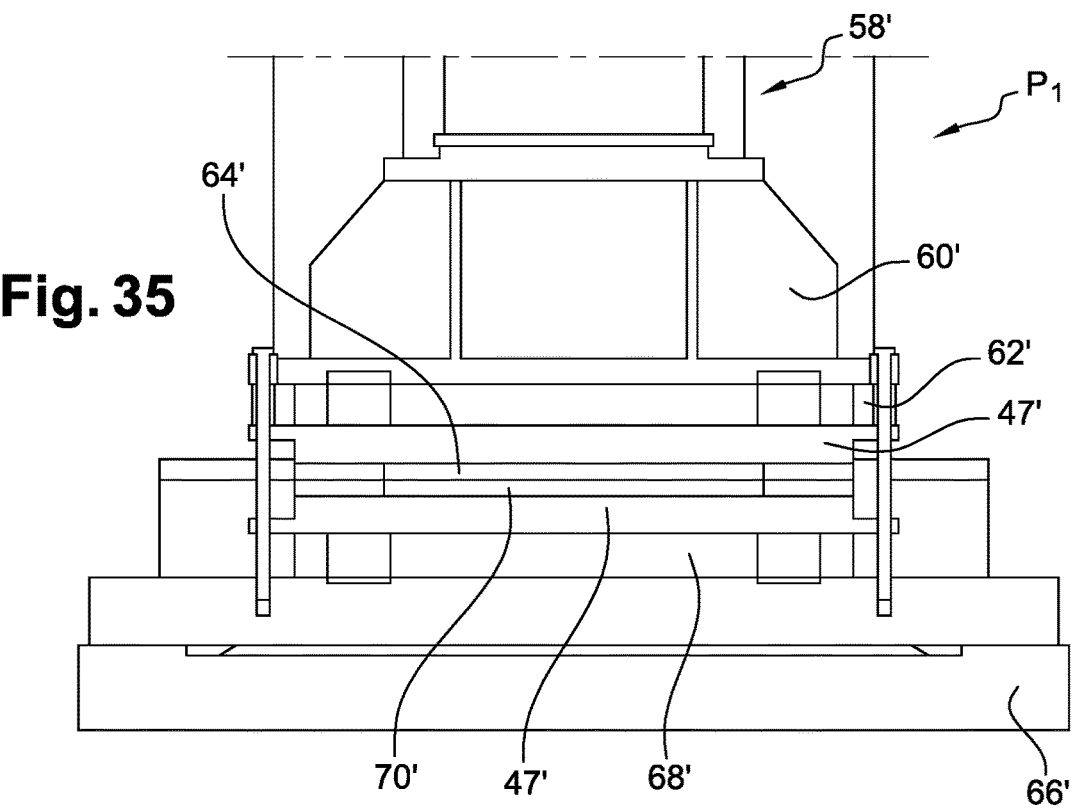
Figure 36:
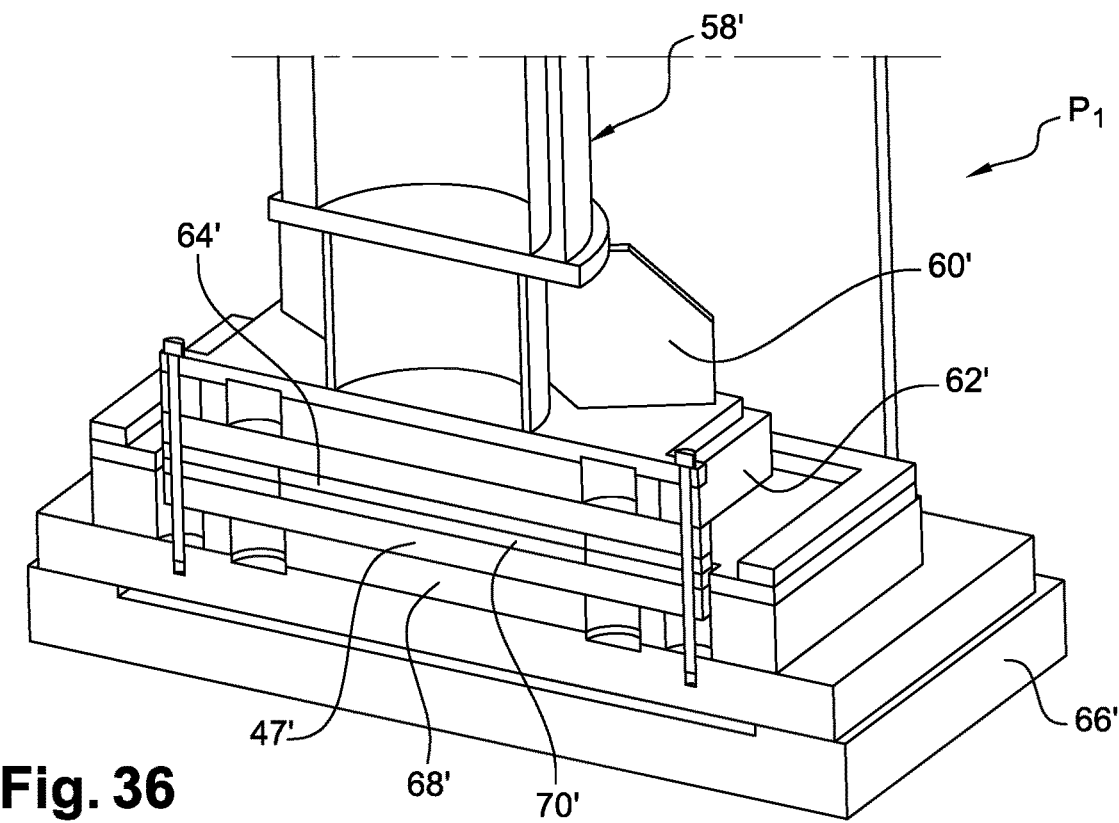

FIGS. 31 and 32 represent a second embodiment of a tray 52' comprising two L-shaped parts 54', 56' defining a distinct central portion 58' between them. Each of the two L-shaped parts 54', 56' includes a cooling channel 59' as described above, the central portion being devoid of a cooling channel and made of a thermally insulating material. The channels 59' of the parts 54', 56' are configured to allow coolant to flow around the central portion and then outwards.

In this embodiment, only one heating cord could be used (not shown), this one surrounding itself around the central portion 58' like a spiral. The central portion 58' is also devoid of any heating means.

It is easy to understand that the shape of the cooling channels is more critical than that of the heating cords because of the longer time required to reduce the temperature by a given number of degrees using a liquid flow than the time required to increase the temperature by the same number of degrees using a resistive type heating cord.

FIGS. 33 to 36 represent the first hydraulic press $P_1$ allowing controlled pressing, heating and cooling of assembly 10 in FIG. 1. This first press P1 is used to heat and cool the lower electrode—polymer electrolyte membrane—upper electrode stacking zone Z1. This first press $P_1$ is intended to be used with a tray 47' according to the first embodiment shown in FIGS. 29 and 30. This zone Z1 includes all the electrodes and preferably only these.

Figure 37:
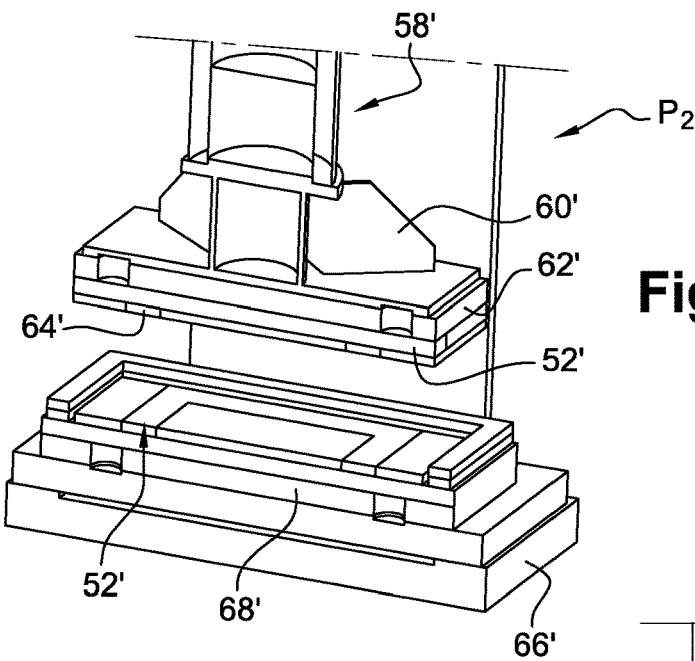
FIGS. 37 to 39 represent a second embodiment of a press comprising a heating and cooling tray.
Figure 38:
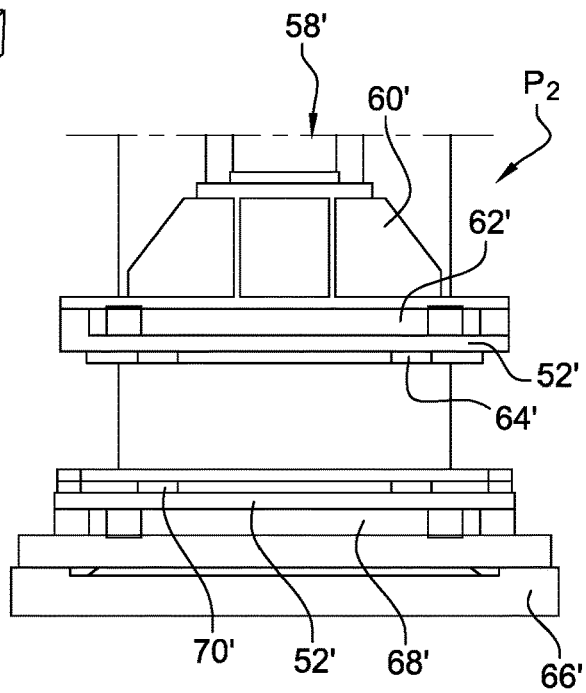
Figure 39:
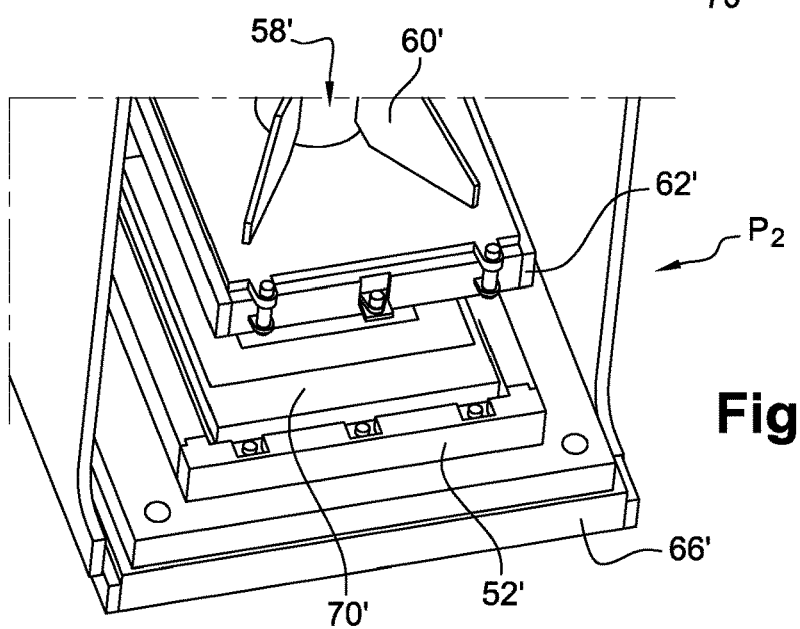

FIGS. 37 to 39 represent the second hydraulic press $P_2$ allowing the heating and pressing of the assembly of FIG. 1 in a peripheral annular zone Z2 surrounding the lower electrode or first electrode 12 and the upper electrode or second electrode 20. This annular zone Z2 internally begins in the immediate vicinity of the outer edges of the first electrode 12 and the second electrode 20. This second press $P_2$ is intended to be used with a tray 52' according to the second embodiment shown in FIGS. 31 and 32.

With reference to FIGS. 33 to 36, the first press $P_1$ includes a piston 58' with a pressure distributor 60' that carries a thermal insulation layer 62' of to limit thermal conduction. A tray 47' as described in reference to FIGS. 29 and 30 is applied to the insulating layer 62', the second face of the tray 47' coming into contact with the insulating layer 62'. A plate 64' or compression sole is applied to the first face of the tray 47'.

The first press $P_1$ comprises a static support 66' arranged opposite the piston 58' which successively carries a layer of thermally insulating material 68', a tray 47' as described in reference to FIGS. 31 and 32 and a plate 70' or compression sole. The tray 47' is positioned so that its first side is in contact with the compression flange 68' and its second side is in contact with the insulating layer 68'.

The plate 64', 70' or compression sole follows the same selection criteria as the material of the first plate 32' as described above.

The second press $P_2$ shown in FIGS. 37 to 39 has a layout that is exactly the same as that described with reference to the first pressure. This second press thus includes a piston 58" comprising an insulating layer 62', a tray 52' and a compression plate 64' of annular shape and a static support 66' bearing an insulating layer 68', a tray 52' and a compression plate 70'.

The presses P1 and P2 as described above as well as the heating and cooling plates are obviously applicable to an assembly that does not perform an "anti-wicking" function, i.e. in which the polymer electrolyte membrane is not confined between the first and second reinforced membranes but extends everywhere between the first reinforced membrane and the second reinforced membrane. Such an assembly is shown in FIG. 2.

The invention claimed is:

1. An installation for assembling fuel cell membranes comprising:
    a first station for storing electrode membranes, a second station for storing reinforcing membranes, a stacking station for the membranes of the first and second storage stations, and a station for pressing and heating a membrane assembly,
    means for conveying and handling the membranes of the first and second storage stations, a stack of the stacking station and a membrane assembly of the pressing and heating station.

2. An installation according to claim 1, wherein the conveying and handling means comprise at least a first and a second manipulators comprising membrane gripping and placing means, the first arm being configured to move an electrode membrane from the first storage station to the stacking station and the second arm being configured to move one or more membranes from the second storage station to the pressing and heating station.

3. An installation according to claim 2, wherein the gripping and placing means of the first and second manipulators include suction gripping means.

4. An installation according to claim 3, wherein the suction gripping means of the first manipulator comprises a plurality of bellows suction cups connected to vacuum supply means.

5. An installation according to claim 3, wherein the suction gripping means of the second manipulator comprise a rigid frame comprising a flat gripping face comprising a plurality of perforations connected to vacuum supply means.

6. An installation according to claim 2, wherein the first manipulator is articulated to cause the first movement of an electrode membrane from the first storage station to a tray of the stacking station with a turning over of the electrode membrane and to cause a second movement of an electrode membrane the first storage station to the tray of the stacking station without turning over of the electrode membrane.

7. An installation according to claim 2, wherein the stacking station comprises a tray provided with a notch sized to receive a portion of the first manipulator carrying an electrode whereas the electrode is flush with an upper surface of the tray.

8. An installation according to claim 2, wherein the conveying and handling means comprises a third manipulator comprising means for gripping and placing a support membrane stored in a third storage station, said third manipulator being configured to bring the support membrane from the third storage station the pressing and heating station.

9. An installation according to claim 8, wherein the means for gripping and positioning of the third manipulator include magnetic gripping means such as electromagnets whose magnetization is controlled by the control means.

10. An installation according to claim 8, wherein the pressing and heating station is interposed in a given direction between a longitudinal rail for moving the third manipulator and the stacking station, said longitudinal direction of the rail being perpendicular to said given direction.

11. An installation according to claim 10, wherein the stacking station is arranged in the longitudinal direction between the first storage station and the second storage station.

12. An installation according to claim 1, comprising a fourth separator sheet storage station and a fourth separator sheet manipulator configured to move an separator sheet from the first storage station to said fourth storage station.

13. An installation according to claim 1, comprising a cutting station, preferably by laser means, of a contour through the membrane assembly after pressing and heating using the pressing and heating station.

14. An installation according to claim 1, wherein the first storage station and the second storage station each comprise a storage magazine and means for positioning the membranes of the associated station in a predetermined position.

15. An installation according to claim 14, wherein each magazine is guided in a rectilinear movement, preferably vertically, in a given direction on a stationary frame and comprises means for damping and returning the magazine to a predetermined position in the absence of a force exerted on the magazine, in said direction, by a manipulator for gripping a membrane of the magazine considered.

16. An installation according to claim 1, wherein it also includes means for securing a stack at the stacking station.

17. An installation according to claim 1, wherein:
the first storage station comprises a stacking in a vertical direction of electrode membranes preferably with a diffusion layer being arranged upwards,
the second storage station comprises an alternation of first reinforcing membranes comprising an opening and second reinforcing membranes comprising an opening, each second reinforcing membrane being secured to a polymer electrolyte membrane which closes its opening and which is arranged opposite a first reinforcing membrane, the polymer electrolyte membrane being sized so that its outer edge is inscribed between the inner and outer edges of the first and second reinforcing membranes,
the third storage station comprises support membranes having an outer edge an inner edge delimiting an opening of the support membrane, said opening being dimensioned so that the polymer electrolyte membrane can fit into said opening and so that the first reinforcing membrane and the second reinforcing membrane can cover the entire inner edge of the support membrane.

18. An installation according to claim 1, wherein:
the first storage station comprises a stacking in a vertical direction of electrode membranes preferably with a diffusion layer being arranged upwards,
the second storage station comprises a plurality of reinforcing membranes, each comprising one opening,
the third storage station comprises a stack of support membranes each formed by a polymer electrolyte membrane.

19. An installation according to claim 18, wherein each supporting membrane is supported by a for example metallic frame.

20. An installation according to one of claim 1, comprising means for controlling the conveying and handling means, so configured that the departure of a stack from the stacking station to the pressing and heating station is followed by a new step of stacking on the stacking station.

* * * * *